(12) United States Patent
Son et al.

(10) Patent No.: US 11,508,175 B2
(45) Date of Patent: Nov. 22, 2022

(54) ELECTRONIC DEVICE

(71) Applicant: Samsung Display Co., Ltd., Yongin-si (KR)

(72) Inventors: Yanghan Son, Cheonan-si (KR); Muhyun Kim, Seoul (KR); Sungmin Kim, Yongin-si (KR); Eunju Shin, Busan (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/259,388

(22) PCT Filed: Feb. 21, 2019

(86) PCT No.: PCT/KR2019/002171
§ 371 (c)(1),
(2) Date: Jan. 11, 2021

(87) PCT Pub. No.: WO2020/036279
PCT Pub. Date: Feb. 20, 2020

(65) Prior Publication Data
US 2021/0279440 A1 Sep. 9, 2021

(30) Foreign Application Priority Data
Aug. 17, 2018 (KR) .................. 10-2018-0095939

(51) Int. Cl.
*G06V 40/13* (2022.01)
*G06F 3/041* (2006.01)
*H04M 1/02* (2006.01)

(52) U.S. Cl.
CPC .............. *G06V 40/13* (2022.01); *G06F 3/041* (2013.01); *H04M 1/026* (2013.01)

(58) Field of Classification Search
None
See application file for complete search history.

(56) References Cited

U.S. PATENT DOCUMENTS 10,437,284 B2   10/2019   Kwak et al.
10,489,629 B1   11/2019   Jiang et al.
(Continued)

FOREIGN PATENT DOCUMENTS

CN   107679486 A   2/2018
CN   108323207 A   7/2018
(Continued)

OTHER PUBLICATIONS

International Search Report for corresponding Application No. PCT/KR2019/002171 dated Jun. 21, 2019, 3pp.

*Primary Examiner* — Nicholas J Lee
(74) *Attorney, Agent, or Firm* — Lewis Roca Rothgerber Christie LLP

(57) ABSTRACT

An electronic device includes a display panel including a base substrate and a plurality of pixels disposed on a front surface of the base substrate to display an image, a cover panel in which an opening part is defined, a fingerprint sensor spaced by a predetermined gap from the cover panel and accommodated in the opening part, and an adhesive member accommodated in the opening part and disposed between the fingerprint sensor and the display panel, and the opening part includes a side surface having a step.

23 Claims, 19 Drawing Sheets

(56) References Cited

U.S. PATENT DOCUMENTS

| | | |
|---|---|---|
| 10,681,823 B2 | 6/2020 | Kim et al. |
| 10,733,408 B2 | 8/2020 | Bok |
| 2017/0212613 A1 | 7/2017 | Hwang et al. |
| 2017/0300736 A1* | 10/2017 | Song ................ G06K 9/0004 |
| 2017/0364763 A1 | 12/2017 | Jin et al. |
| 2018/0150671 A1 | 5/2018 | Choo et al. |
| 2018/0151641 A1 | 5/2018 | Choo et al. |
| 2019/0303640 A1 | 10/2019 | Song et al. |

FOREIGN PATENT DOCUMENTS

| | | |
|---|---|---|
| EP | 3388977 A1 | 10/2018 |
| KR | 10-2014-0108826 A | 9/2014 |
| KR | 10-2017-0087635 A | 7/2017 |
| KR | 10-2017-0119623 A | 10/2017 |
| KR | 10-2017-0125778 A | 11/2017 |
| KR | 10-2018-0005994 A | 1/2018 |
| KR | 10-1841583 B1 | 3/2018 |
| KR | 10-2018-0033361 A | 4/2018 |
| KR | 10-2018-0085627 A | 7/2018 |
| WO | WO 2017/172017 A1 | 10/2017 |

\* cited by examiner

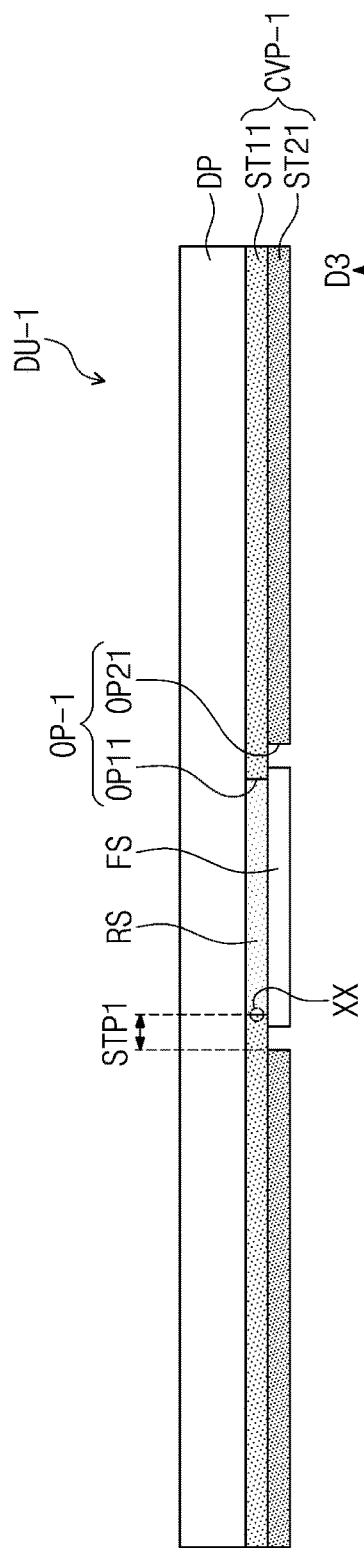
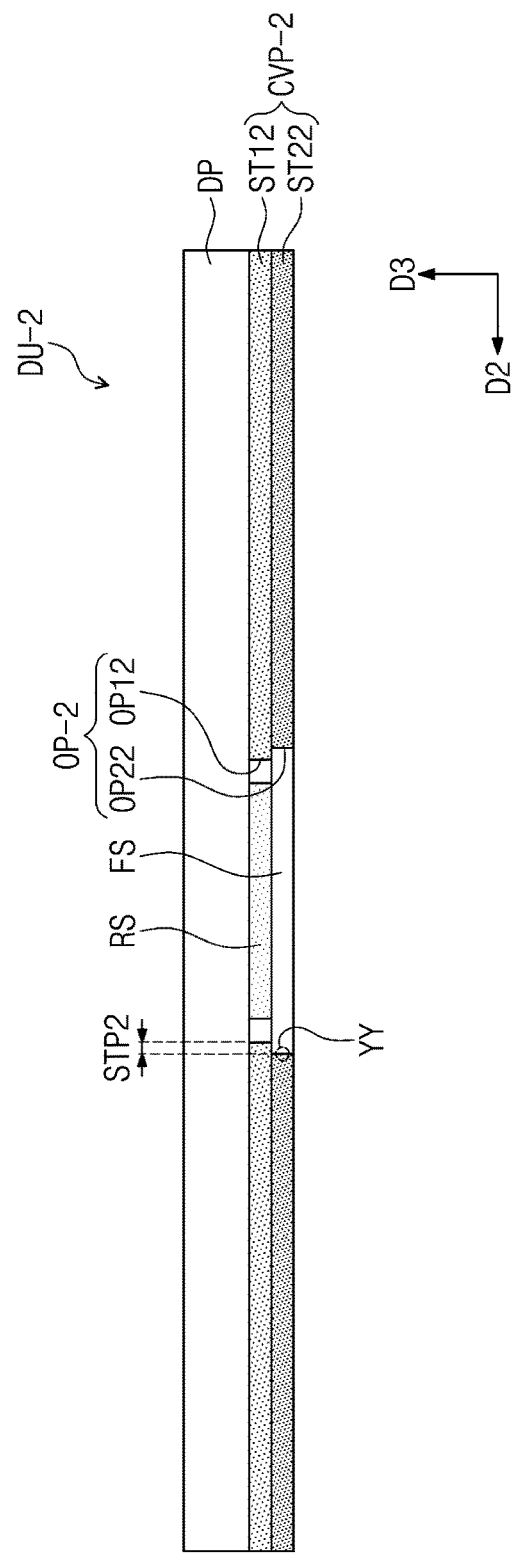

ELECTRONIC DEVICE

CROSS-REFERENCE TO RELATED APPLICATIONS

This application is a National Phase Patent Application of International Application Number PCT/KR2019/002171, filed on Feb. 21, 2019, which claims priority to Korean Patent Application Number No. 10-2018-0095939, filed on Aug. 17, 2018, the entire content of each of which is hereby incorporated by reference.

DESCRIPTION

Technical Field

The present invention relates to an electronic device, and more particularly, to an electronic device including a fingerprint sensing unit.

Background Art

An electronic device provides various functions capable of organically communicating with a user by displaying an image to provide information to the user or sensing an input of the user.

In recent years, the electronic devices include a function of sensing a fingerprint of the user. A fingerprint recognition method includes a capacitive method of sensing a variation in capacitance provided between electrodes, an optical method of sensing incident light by using an optical sensor, and an ultrasonic method of sensing a vibration by using a piezoelectric body. In the recent electronic devices, a fingerprint sensing unit for sensing a fingerprint may be disposed on a rear surface of a display panel and assembled to the electronic device.

DISCLOSURE OF THE INVENTION

Technical Problem

Thus, the present invention provides an electronic device including a fingerprint sensing unit.

Technical Solution

The electronic device according to an embodiment of the present invention includes: a display panel including a base substrate including a front surface and a rear surface opposed to the front surface and a plurality of pixels disposed on the front surface of the base substrate configured to display an image; a cover panel disposed on the rear surface of the display panel and in which an opening part is defined; a fingerprint sensor spaced by a predetermined gap from the cover panel and accommodated in the opening part; and an adhesive member accommodated in the opening part and disposed between the fingerprint sensor and the display panel, and the opening part includes a side surface having a step.

The cover panel may include: a first sheet disposed on the rear surface of the display panel; and a second sheet disposed on a rear surface of the first sheet, the opening part may include: a first opening part passing through the first sheet; and a second opening part passing through the second sheet and overlapping the first opening part, and the first opening part may have a planar size less than that of the second opening part.

The first sheet may include an embossing panel having waviness.

The second sheet may include a cushion panel.

The adhesive member may contact the first sheet.

The fingerprint sensor may be spaced apart from the second sheet.

The adhesive member may be spaced apart from the first sheet.

The fingerprint sensor may be spaced apart from the side surface of the opening part with a predetermined space therebetween, and the spaced space may be filled by the adhesive member.

The front surface of the base substrate may be divided into a first area on which the image is displayed and a second area adjacent to the first area, and the opening part may overlap the first area in a plan view.

The electronic device according to an embodiment of the present invention may further include a lower panel disposed between the cover panel and the display panel, and the adhesive member may couple the lower panel with the fingerprint sensor.

The lower panel may include metal.

The electronic device according to an embodiment of the present invention may further include a cover layer configured to cover the rear surface of the display panel, and the cover layer may have a black color.

The base substrate may have a color.

The electronic device according to an embodiment of the present invention may further include: a circuit board connected to one side of the base substrate; and a sensing circuit board connected with the fingerprint sensor and extending outside the opening part to electrically connect the fingerprint sensor and the circuit board.

The electronic device according to an embodiment of the present invention may further include a touch sensing unit disposed on the front surface of the base substrate, and the touch sensing unit may overlap the pixels in a plan view.

The base substrate may include a planar part and a bending part connected with the planar part and bent toward the rear surface of the base substrate, and the cover panel may be disposed between the planar part and the bending part.

The electronic device according to an embodiment of the present invention include: a display panel including a front surface including a display area configured to display an image and a peripheral area disposed adjacent to the display area and a rear surface opposed to the front surface; a first sheet disposed on the rear surface of the display panel and in which a first opening part overlapping the display area is defined; a second sheet disposed below the first sheet and in which a second opening part overlapping the first opening part is defined; a fingerprint sensor disposed on the rear surface of the display panel and accommodated in the second opening part; and an adhesive member disposed between the fingerprint sensor and the display panel and accommodated in the first opening part, and the adhesive member has a planar size less than that of the fingerprint sensor.

The first opening part may have a planar size less than that of the second opening part.

The adhesive member may contact a side surface of the first opening part.

The adhesive member may be spaced apart from a side surface of the first opening part.

The electronic device according to an embodiment of the present invention may further include a lower panel disposed between the first sheet and the display panel, and the lower panel may include a light reflecting material.

The electronic device may further include a rear surface cover layer disposed between the first sheet and the display panel to cover the rear surface of the display panel, and the rear surface cover layer may include a light absorbing material.

The rear surface cover layer may be disposed directly on the rear surface of the display panel.

Advantageous Effects

According to the present invention, the rear surface visible phenomenon of the display panel, which is generated at the area adjacent to the fingerprint sensor, may be reduced. Thus, the outdoor visibility of the electronic device may be enhanced, and the display characteristic thereof may improve.

BRIEF DESCRIPTION OF THE DRAWINGS

FIGS. 6A to 6C are cross-sectional views of a display panel unit according to an embodiment of the present invention.

MODE FOR CARRYING OUT THE INVENTION

Figure 1A:
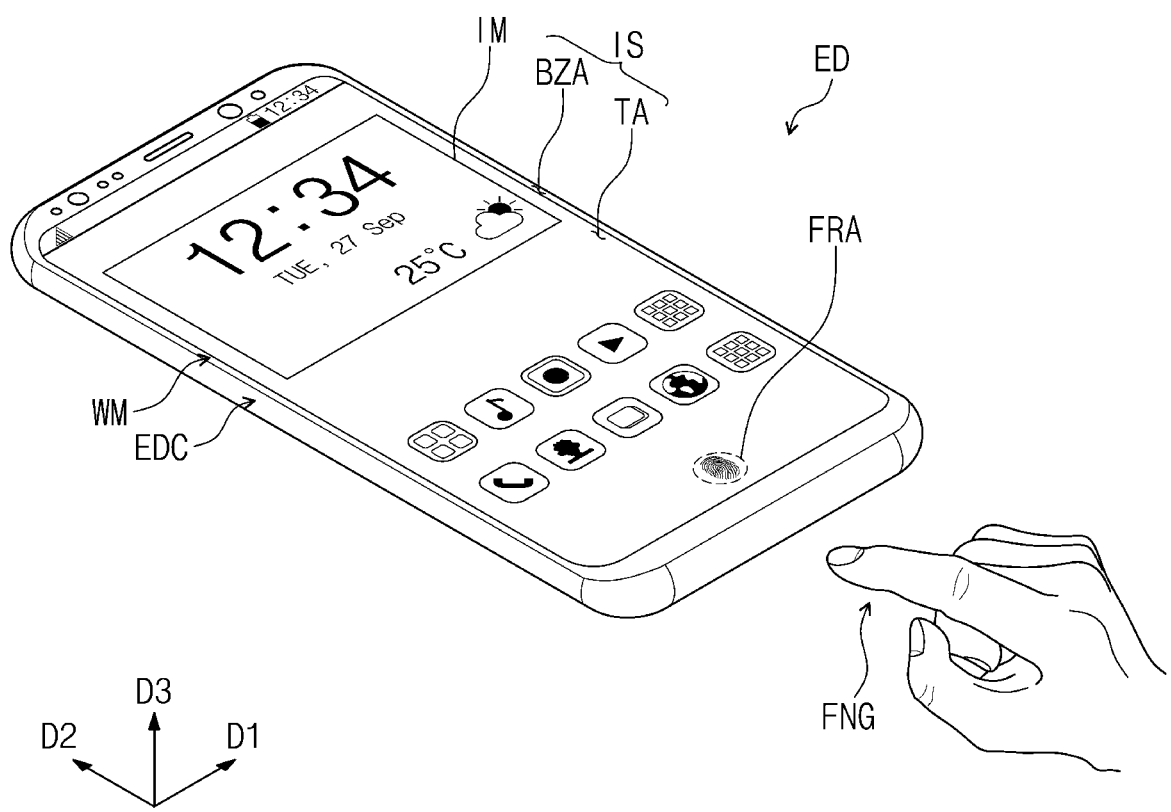
FIG. 1A is a perspective view of an electronic device according to an embodiment of the present invention.

In this specification, it will also be understood that when one component (or region, layer, portion) is referred to as being cony, 'connected to', or 'coupled to' another component, it can be directly disposed/connected/coupled on/to the one component, or an intervening third component may also be present.

Like reference numerals refer to like elements throughout. Also, in the figures, the thickness, ratio, and dimensions of components are exaggerated for clarity of illustration.

The term "and/or" includes any and all combinations of one or more of the associated listed items.

It will be understood that although the terms such as 'first' and 'second' are used herein to describe various elements, these elements should not be limited by these terms. The terms are only used to distinguish one component from other components. For example, a first element referred to as a first element in one embodiment can be referred to as a second element in another embodiment without departing from the scope of the appended claims. The terms of a singular form may include plural forms unless referred to the contrary.

Also, """under", "below", "above', "upper", and the like are used for explaining relation association of components illustrated in the drawings. The terms may be a relative concept and described based on directions expressed in the drawings.

Unless otherwise defined, all terms (including technical and scientific terms) used herein have the same meaning as generally understood by those skilled in the art. Terms as defined in a commonly used dictionary should be construed as having the same meaning as in an associated technical context, and unless defined apparently in the description, the terms are not ideally or excessively construed as having formal meaning.

The meaning of 'include' or 'comprise' specifies a property, a fixed number, a step, an operation, an element, a component or a combination thereof, but does not exclude other properties, fixed numbers, steps, operations, elements, components or combinations thereof.

Hereinafter, embodiments of the present invention will be described with reference to the accompanying drawings.

Figure 1B:
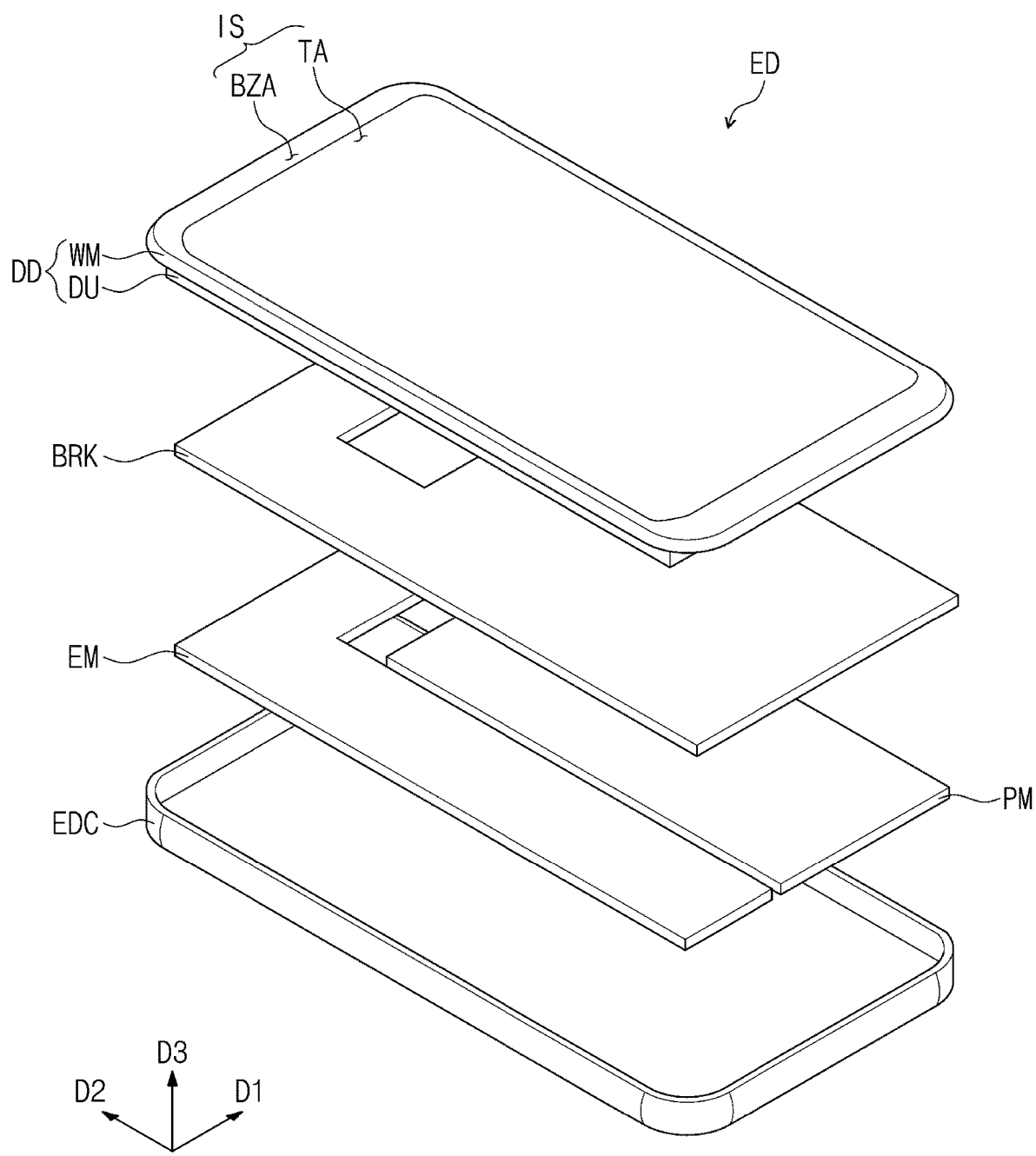
FIG. 1B is an exploded perspective view of the electronic device in FIG. 1A.
Figure 2:
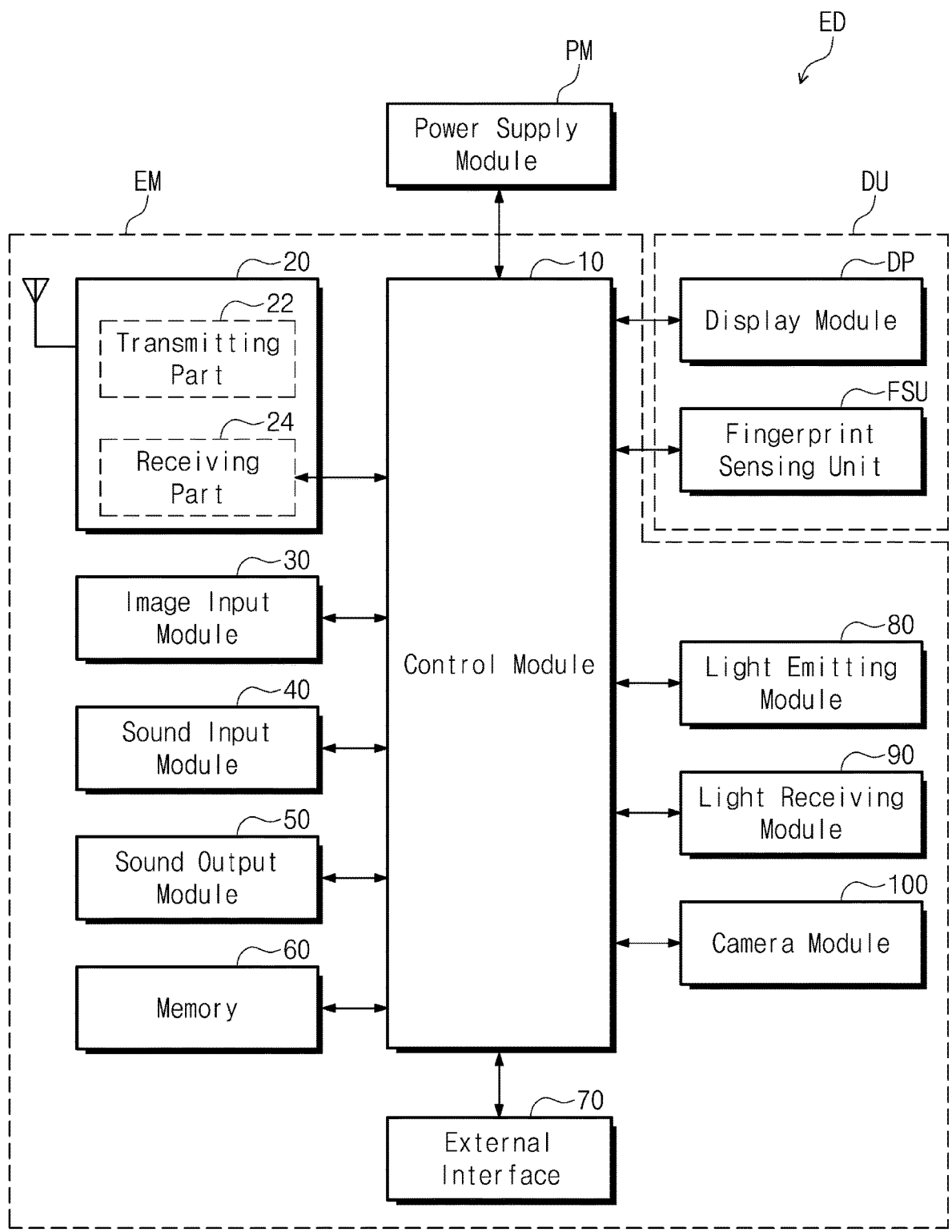
FIG. 2 is a block diagram representing the electronic device in FIG. 1A.

FIG. 1A is a perspective view of an electronic device according to an embodiment of the present invention. FIG. 1B is an exploded perspective view of the electronic device in FIG. 1A. FIG. 2 is a block diagram representing the electronic device in FIG. 1A. Hereinafter, an embodiment of the present invention will be described with reference to FIGS. 1A to 2.

The electronic device ED may be activated according to an electrical signal. The electronic device ED may include various embodiments. For example, the electronic device ED may include tablets, notebook computers, personal computers, and smart televisions. In the embodiment, the electronic device ED is illustrated, for example, as a smart phone.

The electronic device ED may display an image IM on a display surface IS, which is parallel to each of a first direction D1 and a second direction D2, in a third direction D3. The display surface IS, on which the image IM is displayed, may correspond to each of a front surface of the electronic device ED and a front surface IS of a window member IS. Hereinafter, the display surface and the front surface of the electronic device ED and the front surface of the window member WM are indicated by the same reference symbol. The image IM may include a still image as well as a video. FIG. 1A illustrates an internet search window as an example of the image IM.

In the embodiment, a front surface (or a upper surface) and a rear surface (or a lower surface) of each of members are defined based on a direction in which the image IM is displayed. The front surface and the rear surface may be opposed to each other in a third direction DR3, and a normal direction of each of the front surface and the rear surface may be parallel to the third direction DR3. On the other hand, directions indicated by the first to third directions DR1, DR2, and DR3, as relative concepts, may be converted with each other. Hereinafter, first to third directions may be indicated by the first to third directions DR1, DR2, and DR3 and designated by the same reference numerals, respectively.

The front surface of the electronic device ED may be divided into a transmission area TA and a bezel area BZA. The front surface of the electronic device ED may be defined by the front surface IS of the window member WM. Hereinafter, the front surface of the electronic device ED and the front surface IS of the window member WM are indicated by the same reference symbol.

The transmission area TA may be an area on which the image IM is displayed. A user may recognize the image IM through the transmission area TA. In the embodiment, the transmission area TA has a rectangular shape having rounded vertices. However, this is merely illustrative, and the transmission area TA may have various shapes and not be limited to any one embodiment.

The bezel area BZA is adjacent to the transmission area TA. The bezel area BZA may have a predetermined color. The bezel area BZA may surround the transmission area TA. Thus, the transmission area TA may have a shape that is substantially defined by the bezel area BA. However, this is merely illustrative, and the bezel area BZA may be disposed adjacent to only one side of the transmission area TA or omitted. The electronic device according to an embodiment of the present invention may include various embodiments and not be limited to any one embodiment.

The electronic device ED may sense a fingerprint FNG of the user applied from the outside. Thus, the electronic device ED may provide a fingerprint sensing area FRA to the display surface IS. In the embodiment, it is illustrated that the fingerprint sensing area FRA is provided in the transmission area TA on which the image IM is displayed. However, this is merely illustrative, and the fingerprint sensing area FRA may be provided to the bezel area BZA, provided to an entire area of the transmission area TA, or provided to an entire area of the front surface IS. The electronic device ED may sense the fingerprint FNG provided to the fingerprint sensing area FRA.

The fingerprint FNG of the user may include a surface state of a hand of the user, e.g., surface uniformity, a surface unevenness shape, or the like. However, this is merely illustrative, and when an input of an intangible object is provided to the electronic device ED, the electronic device ED may even sense surface information of the intangible object.

When components of the electronic device ED are checked with reference to FIGS. 1B and 2, the electronic device ED may include a display device DD, an electronic module EM, a power supply module PM, a bracket BRK, and an external case EDC. The components are simply illustrated in FIGS. 1A and 1B.

The display device DD includes a window member WM and a display panel unit DU. As illustrated in FIG. 1A, the window member WM constitutes an appearance of the electronic device ED in a coupled state. The window member WM may be a component protecting internal components of the electronic device ED from an external impact, and substantially providing the display surface IS of the electronic device ED.

The display panel unit DU is disposed on a rear surface of the window member WM. The display panel unit DU may include a display panel DP and a fingerprint sensing unit FSU. The display panel DP may be a component that substantially generates the image IM. The image IM generated by the display panel DP may be displayed on the display surface IS and recognized by the user from the outside through the transmission area TA.

The fingerprint sensing unit FSU senses the fingerprint FNG of the user applied from the outside. As described above, the fingerprint sensing unit FSU may sense the fingerprint FNG of the user provided to the fingerprint sensing area FRA Detailed description regarding this will be described later.

The display panel unit DU may be electrically connected to an electronic module EM through a flexible circuit board. The display panel unit DU may receive information on the image IM to be displayed through the electronic module EM or provide information, which is processed by providing the sensed fingerprint FNG to the electronic module EM, to the user.

The power supply module PM provides power that is necessary to overall operations of the electronic device ED. The power supply module PM may include a typical battery module.

The bracket BRK is coupled with the display device DD and/or the external case EDC and divides an inner space of the electronic device ED. The bracket BRK provides a space in which other components are disposed. Also, the bracket BRK may support the display device DD so that the display device DD is fixed without being shaken. A coupling groove corresponding to a shape of the electronic module EM may be defined in the bracket BRK so that the electronic module EM is fixed. The bracket BRK includes a metal or plastic member. Although one bracket BRK is illustrated as an example, the electronic device ED may include a plurality of brackets BRK.

The external case EDC may be coupled to the bracket BRK and/or the display device DD. In the embodiment, the external case EDC provides the appearance of the electronic device ED in conjunction with the window member WM. Although the external case EDC having one body is illustrated as an example, the external case EDC may include a plurality of bodies that are assembled with each other. The external case EDC may include a plurality of frames and/or plates, which are made of glass, plastic, and metal.

The electronic module EM includes a motherboard and various functional modules mounted on the motherboard to operate the electronic device ED. The motherboard may be electrically connected to the display device DD through a connector. Here, the motherboard may include a rigid-type printed circuit board.

The electronic module EM may include a control module 10, a wireless communication module 20, an image input module 30, a sound input module 40, a sound output module 50, a memory 60, an external interface 70, a light emitting module 80, a light receiving module 90, a camera module 100, and the like. Some of the above-described modules may be electrically connected to the motherboard through a flexible circuit board instead of being mounted to the motherboard.

The control module 10 controls an overall operation of the electronic device ED. The control module 10 may be a microprocessor. For example, the control module 10 activates or deactivates the display device DD. The control module 10 may control the image input module 30, the sound input module 40, the sound output module 50, and the like on the basis of a touch signal received from the display module DM.

The wireless communication module 20 may transceive a wireless signal with another terminal by using Bluetooth or WiFi-link. The wireless communication module 20 may use a general communication line to transceive an audio signal. The wireless communication module 20 includes a transmitting part 22 modulating a signal to be transmitted and transmitting the modulated signal and a receiving part 24 demodulating a received signal.

The image input module 30 processes an image signal to convert the image signal into image data that is displayable on the display device DD. The sound input module 40 receives an external sound signal through a microphone in a recording mode or a voice recognition mode to convert the received sound signal into electrical voice data. The sound output module 50 converts sound data received from the wireless communication module 20 or sound data stored in the memory 60 and outputs the converted sound data to the outside.

The external interface 70 serves as an interface connected to an external charger, a wire/wireless data port, a card socket (e.g., a memory card socket and a SIM/UIM card socket), or the like.

The light emitting module 80 generates and outputs light. The light emitting module 80 may output infrared light. The light emitting module 80 may include a LED element. The light receiving module 90 may sense infrared light. The light receiving module 90 may be activated when infrared light having a predetermined level or more is sensed. The light receiving module 90 may include a CMOS sensor. Infrared light generated from the light emitting module 80 may be outputted and then reflected by an external object (e.g., a user's finger or face), and the reflected infrared light may be incident into the light receiving module 90. The camera module 100 photographs an external image.

Figure 3A:
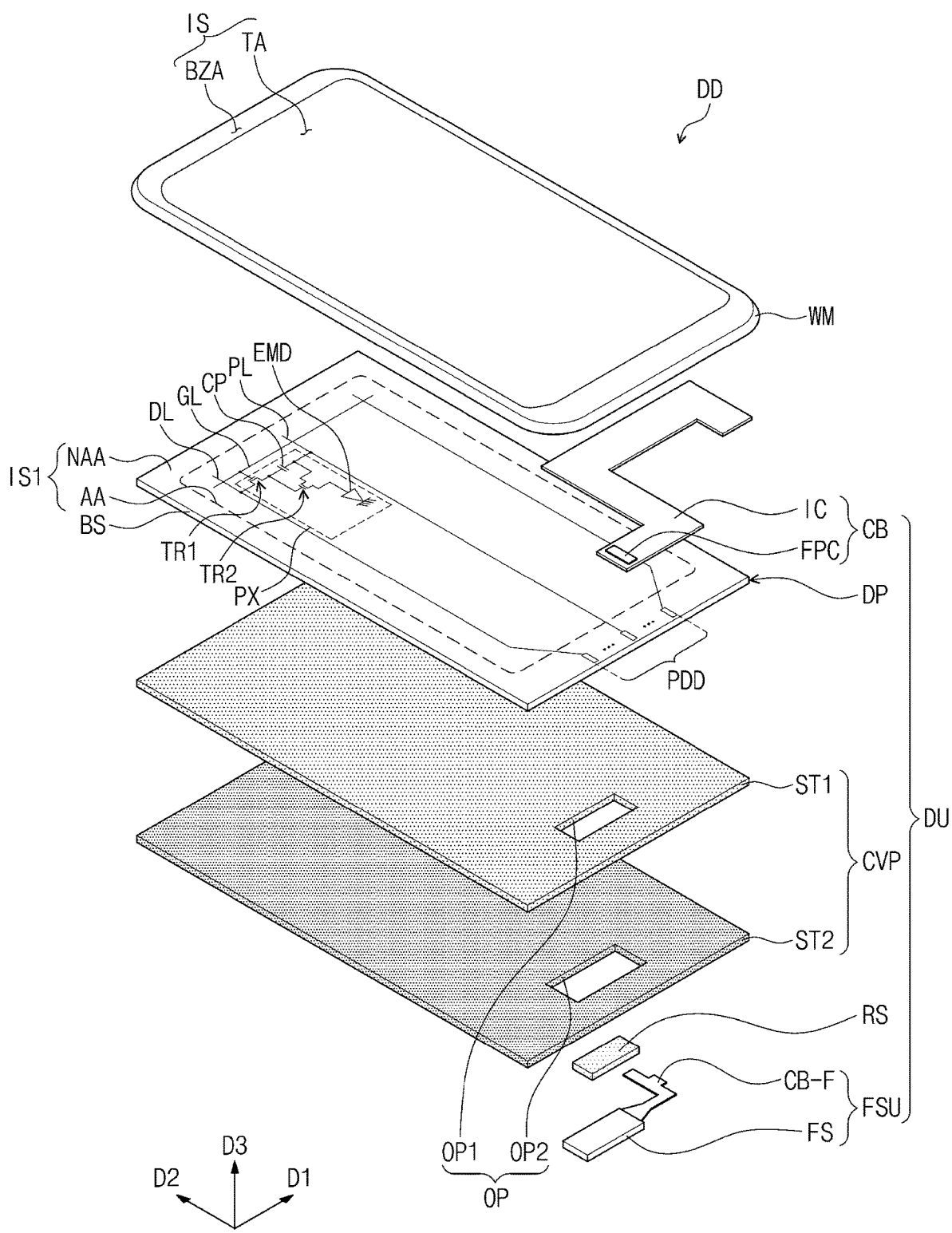
FIG. 3A is an exploded perspective view illustrating a portion of components illustrated in FIG. 2A.
Figure 3B:
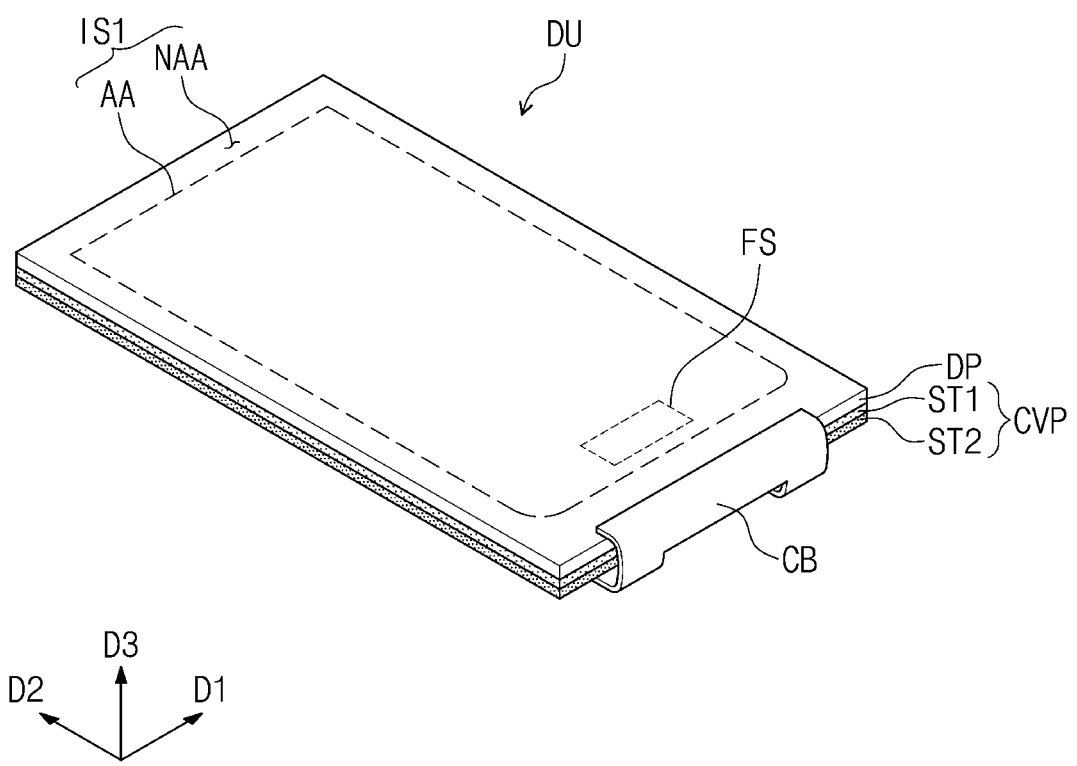
FIG. 3B is a coupling perspective view illustrating a portion of components illustrated in FIG. 3A.
Figure 4:
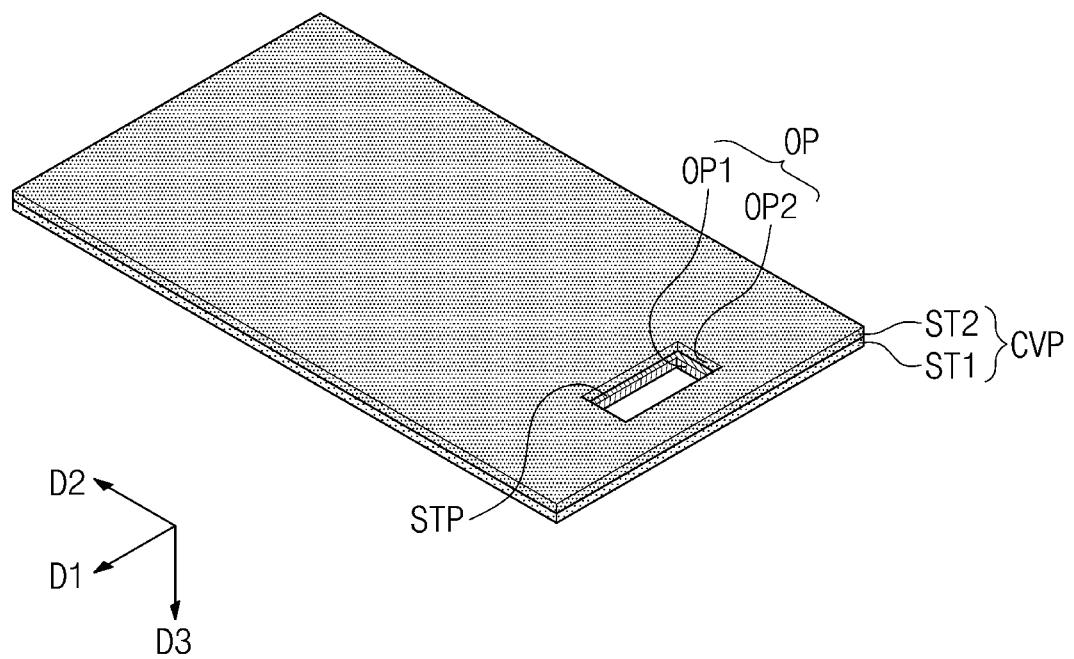
FIG. 4 is a coupling perspective view illustrating a portion of components illustrated in FIG. 3A.

FIG. 3A is an exploded perspective view illustrating a portion of the components illustrated in FIG. 2A. FIG. 3B is a coupling perspective view illustrating a portion of the components illustrated in FIG. 3A. FIG. 4 is a coupling perspective view illustrating a portion of the components illustrated in FIG. 3A. FIG. 3A illustrates an exploded perspective view of the display device DD, and FIG. 3B illustrates a coupling perspective view of the display panel unit DU except for the window member WM. FIG. 4 illustrates a perspective view of a rear surface of a cover panel CVP. Hereinafter, the present invention will be described with reference to FIGS. 3A to 4.

The display device DD may include a window member WM and a display panel unit DU. Specifically, the display panel unit DU includes a display panel DP, a circuit board CV, a cover panel CVP, a fingerprint sensing unit FSU, and an adhesive member RS.

As described above, the window member WM includes a front surface including a transmission area TA that is optically clear and a bezel area BZA disposed adjacent to the transmission area TA. Hereinafter, since the window member WM corresponds to the window member WM in FIG. 2A, overlapped description will be omitted.

The display panel DP includes a base substrate BS, a plurality of signal lines DL, GL, and PL, a plurality of pixels PX, and a plurality of display pads PDD. In the embodiment, a signal circuit diagram of one pixel PX is simply illustrated for easy description.

The base substrate BS includes a front surface IS1 and a rear surface, which are opposed to each other in the third direction D3. The front surface IS1 is divided into an active area AA and a peripheral area NAA in a plan view. In the embodiment, a rear surface of the base substrate BS may be provided as a rear surface of the display panel DP.

The active area AA may be an area on which the image IM (refer to FIG. 1) is displayed. The display panel DP activates the active area AA according to an electrical signal. The image IM is displayed on the activated active area AA. The transmission area TA may overlap at least the entire active area AA.

The peripheral area NAA is disposed adjacent to the active area AA. The peripheral area NAA may surround an edge of the active area AA. However, this is merely illustrative, and the peripheral area NAA may be adjacent to only a portion of the edge of the active area AA and not be limited to any one embodiment.

All sorts of signal lines, electronic elements, or the like, which provide an electrical signal to the active area AA, may be disposed on the peripheral area NAA. The peripheral area NAA may be covered by the bezel area BZA and may not be recognized from the outside.

The plurality of signal lines GL, DL, and PL, the pixel PX, and the plurality of display pads PDD are disposed on the front surface IS1 of the base substrate BS. The signal lines GL, DL, and PL may include a gate line GL, a data line DL, and a power line PL. The gate line GL, the data line DL, and the power line PL may transmit different electrical signals from each other.

The gate line GL extends in the first direction D1. Although the gate line GL may be provided in plurality, and a plurality of gate lines may be spaced apart from each other in the second direction D2, the single gate line GL is illustrated as an example for easy description.

On the other hand, although not shown, the display panel unit DU may further include a gate driving circuit mounted to the front surface IS1 of the base substrate BS and providing an electrical signal to the gate line GL. Here, a gate driving circuit pad providing an electrical signal to the gate driving circuit may constitute any one of the display pads PDD. Alternatively, the display panel DP may further include gate pads that are electrically connected with the gate driving circuit provided at the outside. The gate pads may constitute any one of the display pads PDD.

The data line DL extends in the second direction D2. The data line DL may be electrically connected with the gate line GL. Although the data line DL may be provided in plurality, and a plurality of data lines may be spaced apart from each other in the first direction D1, the single data line DL is illustrated as an example for easy description. The data line DL is connected to a data pad constituting any one of the pads PDD. The data line DL provides a data signal received through the data pad to the pixel PX.

The power line PL extends in the second direction D2. The power line PL may be electrically connected with the gate line GL and the data line DL. Although the power line PL may be provided in plurality, and a plurality of power lines may be spaced apart from each other in the first direction D1, the single power line PL is illustrated as an example for easy description. The power line PL may provide a power signal to the pixel PX.

The pixel PX is displayed on the active area AA. Although the pixel PX may be provided in plurality, and a plurality of pixels may be connected to the signal lines, respectively, the single pixel PX is illustrated as an example for easy description. The pixel PX displays light to realize the image IM according to an electrical signal.

The pixel PX may include a first thin-film transistor TR1, a second thin-film transistor TR2, a capacitor CP, and a light emitting element EMD. The first thin-film transistor TR1, the second thin-film transistor TR2, the capacitor CP, and the light emitting element EMD are electrically connected to each other. On the other hand, although the entire pixel PX is located within the active area AA in the embodiment, the embodiment of the present invention is not limited thereto. For example, the first thin-film transistor TR1, the second thin-film transistor TR2, and the capacitor CP may be located at the peripheral area NAA, and not be limited to any one embodiment.

The first thin-film transistor TR1 may be a switching element controlling turn-on and turn-off of the pixel PX. The first thin-film transistor TR1 is connected to the gate line GL and the data line DL. The first thin-film transistor TR1 is turned-on by a gate signal provided through the gate line GL and provides a data signal provided through the data line DL to the capacitor CP.

The capacitor CP charges a voltage corresponding to a potential difference between a first power signal provided from the power line PL and a signal provided from the first thin-film transistor TR1. A second thin-film transistor TR2 provides a first power signal provided from the power line PL to the light emitting element EMD in correspondence to the voltage charged in the capacitor CP.

The light emitting element EMD may generate light or control a light amount according to an electrical signal. For example, the light emitting element EMD may include an organic light emitting element, a quantum dot light emitting element, an electrophoretic element, or an electrowetting element.

The light emitting element EMD is connected with a power terminal VSS and receives a power signal different from the power signal provided by the power line PL. A driving current corresponding to a difference between a second power signal and an electrical signal provided from the second thin-film transistor TR2 may flow through the light emitting element EMD, and the light emitting element EMD may generate light corresponding to the driving current.

However, this is merely illustrative, and the pixel PX may include electronic elements having various configurations and arrangements and not be limited to any one embodiment.

The pads PD are located at the peripheral area NAA. The pads PD may be connected to the signal lines, respectively. The pixels PX may be electrically connected with elements located outside the display panel DP through the pads PD.

The circuit board CB is connected to the pads PD. The circuit board CB provides an electrical signal to the display panel DP through the pads PD. The circuit board CB may generate a signal controlling the image IM or a power signal and provide the generated signal to the display panel DP. The circuit board CB may include a flexible substrate FCB and a driving element IC.

The flexible substrate FCB may be electrically connected to the display panel DP through the display pads PDD. The flexible substrate FCB is electrically and physically coupled to the display panel DP through an adhesive member (e.g., an anisotropic conductive film). The flexible substrate FCB may include signal lines.

The driving circuit IC may be mounted on the flexible substrate FCB. The driving element IC may be connected to the signal lines of the flexible substrate FCB and electrically connected to the display panel DP. The driving element IC generates or processes all sorts of electrical signals.

The circuit board CB may be coupled to the display panel DP and then bent toward the rear surface of the base substrate BS. Thus, the driving element IC may not be recognized when viewed from the front surface of the display panel unit DU.

The cover panel CVP may be coupled to the rear surface of the display panel DP. The cover panel CVP may include a first sheet ST1 and a second sheet ST2. The first sheet ST1 covers the rear surface of the display panel DP. The first sheet ST1 may be attached to the display panel DP through an adhesive member.

The first sheet ST1 may include a front surface having a tiny waviness. For example, the first sheet ST1 may include an embossed sheet. The first sheet ST1 may have a wavy front surface facing the display panel DP. The waviness provided to the first sheet ST1 may prevent ununiform bubble formation between the display panel DP and the first sheet ST1 and improve a coupling force between the display panel DP and the first sheet ST1.

The second sheet ST2 is located below the first sheet ST1. The second sheet ST2 may be a cushion sheet. Specifically, the second sheet ST2 may include a sponge, a foam, or a urethane resin. The second sheet ST2 protects the display panel DP by absorbing an external impact applied to the rear surface of the display panel DP. The second stage ST2 may be directly provided to the first sheet ST1 or coupled to the first sheet through a separate adhesive layer.

However, this is merely illustrative, and the cover panel CVP may further include an additional sheet in addition to the first sheet ST1 or the second sheet ST2 and not be limited to any one embodiment.

In the embodiment, a predetermined opening part OP may be defined in the cover panel CVP. The opening part OP overlaps the active area AA on the plane. The opening part OP may be defined by passing through the cover panel CVP in the third direction D3. Specifically, the opening part OP may pass through the first sheet ST1 and the second sheet ST2 to expose the rear surface of the display panel DP. The opening part OP includes a side surface having a step STP.

The opening part OP includes a first opening part OP1 and a second opening part OP2. The first opening part OP1 passes through the first sheet ST1. The second opening part OP2 passes through the second sheet ST2. The second opening part OP2 may be defined as a position overlapping the first opening part OP1.

The first opening part OP1 may have a planar size less than that of the second opening part OP2. The planar size is an area in a plan view. In the embodiment, each of the first opening part OP1 and the second opening part OP2 has a rectangular shape. The first opening part OP1 may have a rectangular shape greater in size than that of the second opening part OP2. However, this is merely illustrative, and each of the first opening part OP1 and the second opening part OP2 may have various shapes and not be limited to any one embodiment.

As a side surface of the first opening part OP1 is connected with a side surface of the second opening part OP2, the side surface of the opening part is defined. Thus, the opening part OP may include the side surface having the step STP. In FIG. 4, the step STP is hatched for easy description. As the cover panel CVP according to the present invention includes the opening part OP having the side surface in which the step STP is defined, an external light visible phenomenon at the rear surface of the display panel DP may be relieved. Detailed description regarding this will be described later.

The fingerprint sensing unit FSU may be located on the rear surface of the display panel DP. The fingerprint sensing unit FSU may include a fingerprint sensor FS and a sensing circuit board CB-F. The sensing circuit board CB-F is electrically connected with the fingerprint sensor FS.

The fingerprint sensor FS may include sensors that are driven in various methods. For example, the fingerprint sensor FS may include an optical-type fingerprint sensor that senses incident light by using an optical sensor and an ultrasonic-type fingerprint sensor that senses a vibration by using a piezoelectric body. However, the embodiment of the present invention is not limited to any one driving method.

The adhesive member RS is located on the rear surface of the display panel DP. The adhesive member RS is accommodated in the opening part OP. The adhesive member RS is located between the display panel DP and the fingerprint sensing unit FSU. Specifically, the adhesive member RS is located in the first opening part OP1 to couple the display panel with the fingerprint sensing unit FSU.

In the embodiment, the adhesive member RS may have a planar size less than that of the fingerprint sensor FS. Thus, the adhesive member RS and the fingerprint sensor FS may provide a step on the plane.

The adhesive member RS includes an adhesive material. The adhesive material may include a resin. The adhesive member RS may be provided in various types. For example, the adhesive member RS may be provide in a liquid state and then cured or provided as a sheet such as a double-sided tape to couple the display panel DP with the fingerprint sensor FS.

The adhesive member RS may be optically clear. For example, the adhesive member RS may include an optical clear resin (OCR), an optical clear adhesive (OCA), or a pressure sensitive adhesive (PSA). When the fingerprint sensor FS is driven by an optical method, as a transparency of the adhesive member RS increases, a fingerprint sensitivity of the fingerprint sensor FS may improve.

Alternatively, the adhesive member RS may be optically unclear. When the fingerprint sensor FS is driven by an ultrasonic method, the fingerprint sensor FS may provide a stable fingerprint sensitivity to the user regardless of the transparency of the adhesive member S. The adhesive member RS according to an embodiment of the present invention may be provided in various kinds according to the driving method of the fingerprint sensor FS, and not be limited to any one embodiment.

The fingerprint sensor FS according to an embodiment of the present invention is accommodated in the opening part OP defined in the cover panel CVP. The fingerprint sensor FS is located on the rear surface of the display panel DP and accommodated in the opening part OP. The fingerprint sensor FS may overlap the display panel DP on the plane. In FIG. 3B, an area on which the fingerprint sensor FS is located is illustrated by a dotted line for easy description. According to the present invention, in the embodiment, the fingerprint sensor FS may overlap the active area AA. As the fingerprint sensor FS is provided in the active area AA, fingerprint information of an external input applied to the active area AA may be easily sensed, and an additional fingerprint sensing area may not be provided to reduce the bezel.

According to the present invention, as the first opening part OP1 and the second opening part OP2, which have different sizes, are defined, the opening part OP has the side surface having the predetermined step STP. A step ST define din the cover panel CVP may relieve a rear surface visible phenomenon of the display panel PD caused by light leakage to a space between the fingerprint sensing unit FSU and the opening part OP. Thus, the electronic device having an improved display characteristic may be provided. Detailed description regarding this will be described later.

Figure 5A:
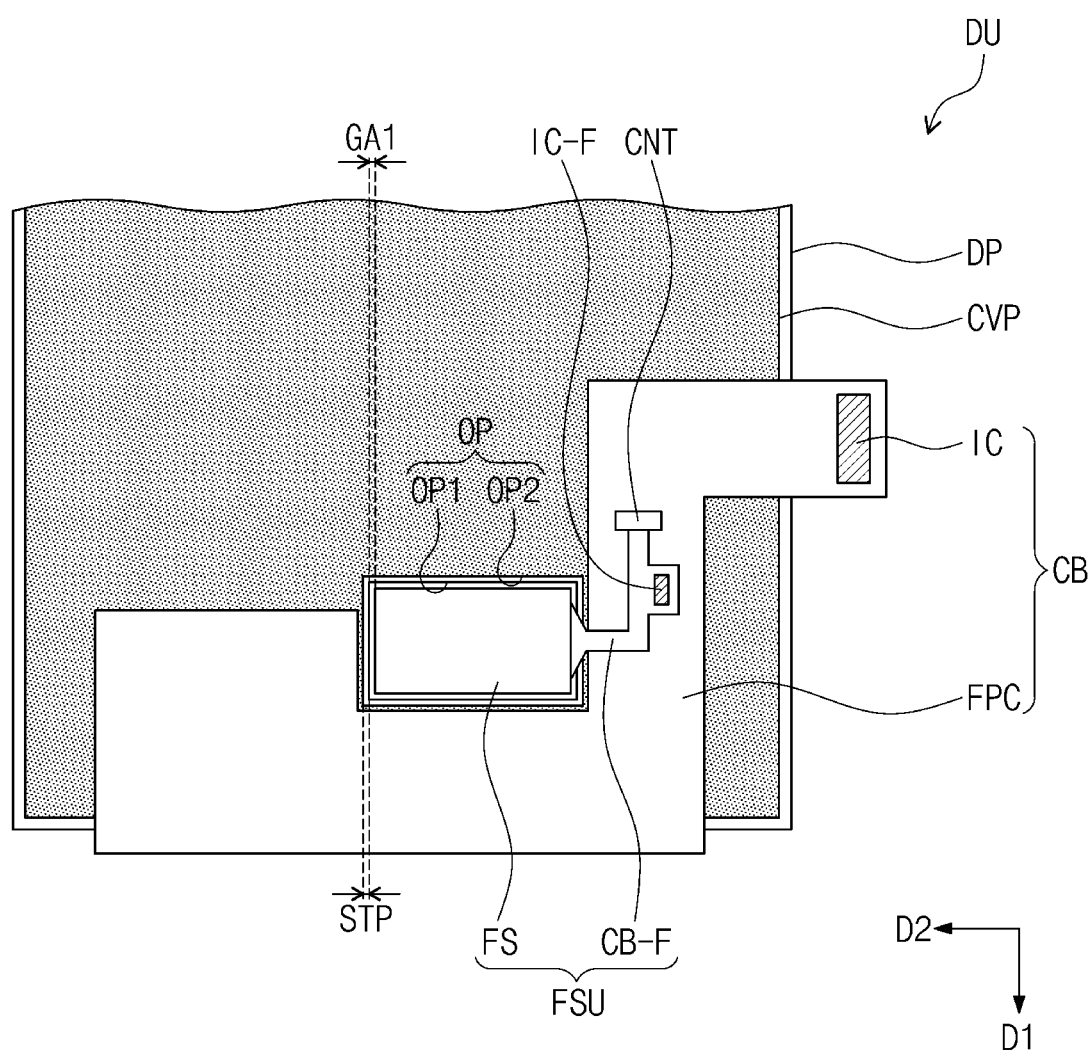
FIG. 5A is a rear view illustrating a portion of a display panel unit according to an embodiment of the present invention.
Figure 5B:
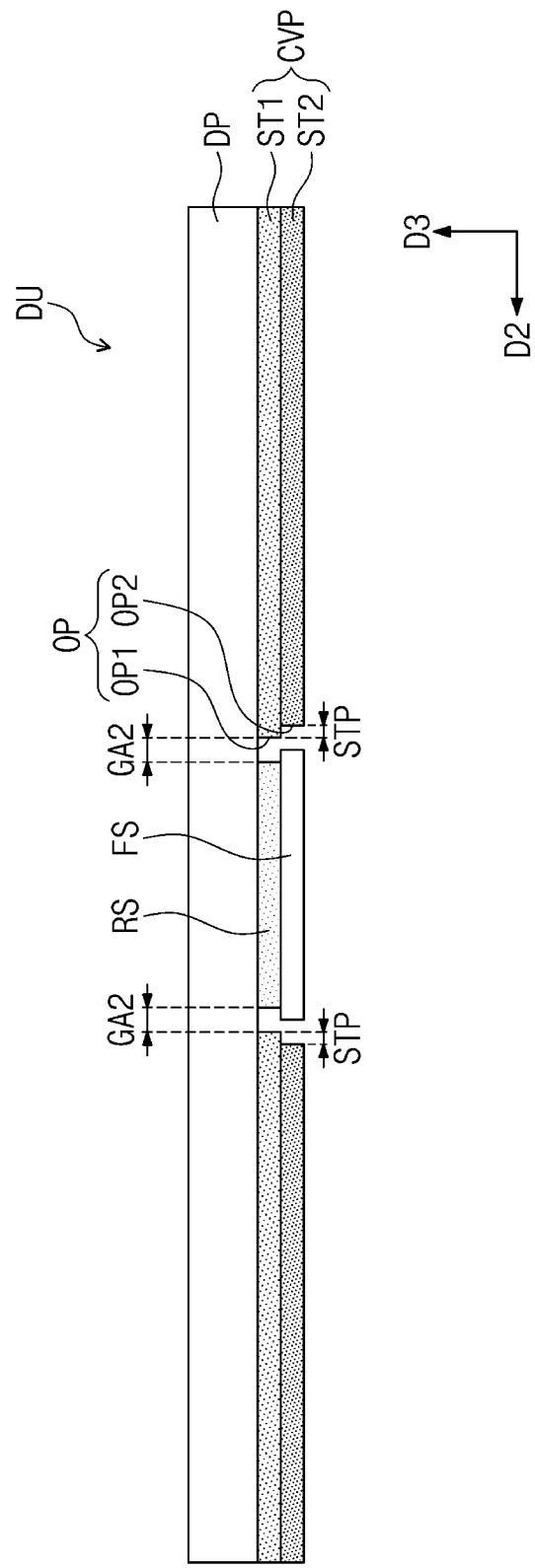
FIGS. 5B and 5C are cross-sectional views illustrating the display panel unit according to an embodiment of the present invention.
Figure 5C:
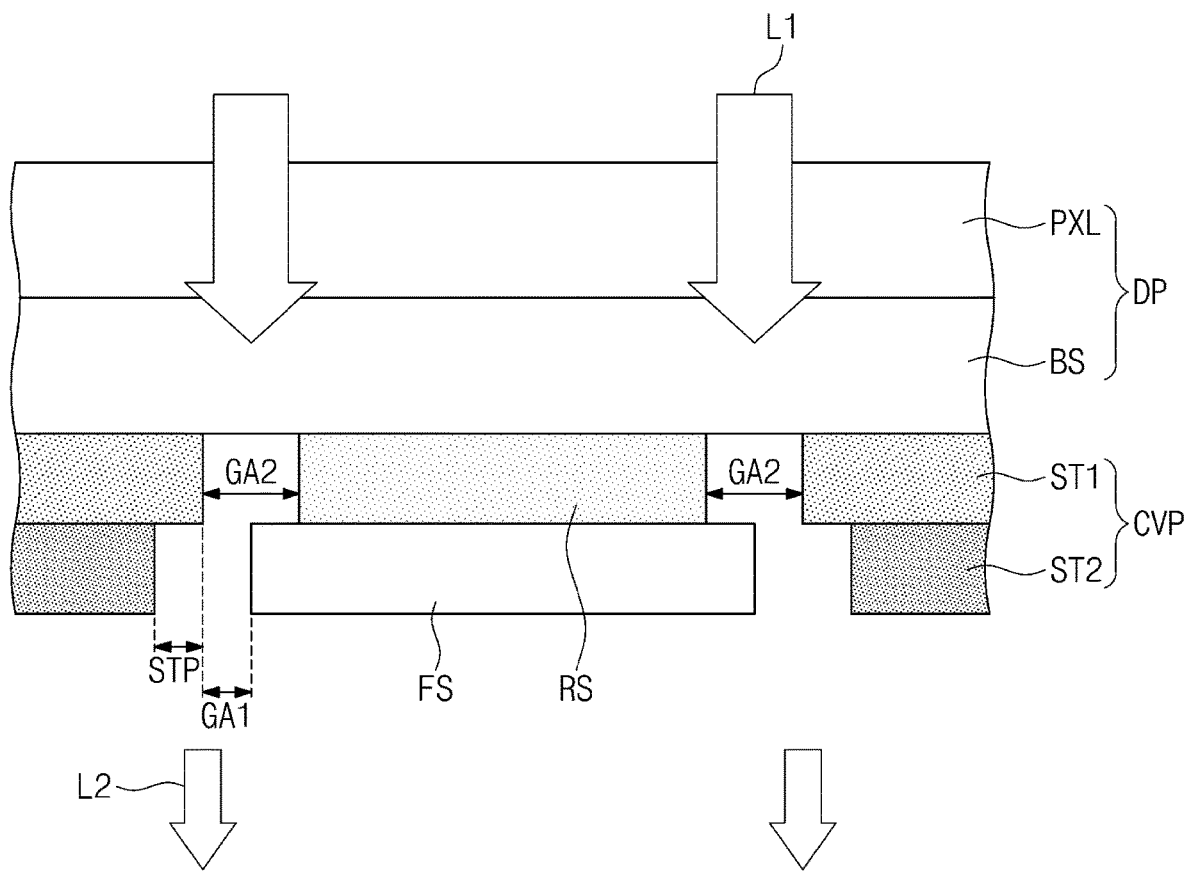

FIG. 5A is a rear view illustrating a portion of the display panel unit according to an embodiment of the present invention. FIGS. 5B and 5C are cross-sectional views illustrating the display panel unit according to an embodiment of the present invention. For easy description, a portion of components are omitted in FIGS. 5B and 5C. Also, in FIG. 5C, a portion of the display panel unit is enlargedly illustrated, and a degree of transmission of light is illustrated. Hereinafter, the present invention will be described with reference to FIGS. 5A to 5C. Here, the same components as those described in FIGS. 1A to 4 are designated by the same reference symbols, respectively, and overlapped description thereof will be omitted.

As illustrated in FIG. 5A, the circuit board CB may be bent from one side of the display panel DP and located on the rear surface of the display panel. The driving element IC may be recognized from a rear surface of the display panel unit DC. Here, the circuit board CB may be bent while covering a portion of a rear surface of the second sheet ST2 of the cover panel CVP.

On the other hand, the sensing circuit board CB-F may be connected to the circuit board CV and electrically connected with the circuit board CB. In the embodiment, the sensing circuit board CB-F may be connected to the circuit board CB through a predetermined connector CNT located on the circuit board CB. Thus, the fingerprint sensor FS may be electrically connected with the circuit board CB and substantially transceive an electrical signal with the display panel DP. On the other hand, although the predetermined driving element IC-F is illustrated to be mounted to the sensing circuit board CB-F, this is merely illustrative, and the driving element IC-F may be omitted from the sensing circuit board CB-F and not be limited to any one embodiment.

The sensing circuit board CB-F may be partially accommodated in the opening part OP. For example, a portion of a side, which is connected to the fingerprint sensor FS, of the sensing circuit board CB-F may overlap the first opening part OP1 and the second opening part OP2. The rest portion of the sensing circuit board CB-F may extend to an outside of the second opening part OP2 and be connected to the circuit board CB. However, this is merely illustrative, and the entire sensing circuit board CB-F may be accommodated in the opening part OP defined in the cover panel CVP according to a shape and a size of the sensing circuit board CB-F and not be limited to any one embodiment.

The fingerprint sensor FS is accommodated in the opening part OP of the cover panel CVP. The opening part OP of the cover panel CVP may have a size enough to accommodate the fingerprint sensor FS. The fingerprint sensor FS may be spaced apart from each of the first opening part OP1 and the second opening part OP2 on the plane. When the rear surface of the cover panel CVP is viewed, a predetermined spaced space GA (hereinafter, referred to as a first gap) may be defined between the fingerprint sensor FS and the side surface of the first opening part OP1. The first gap GA1 may be defined along an edge of the fingerprint sensor FS. The first gap GA1 may have a constant width along the edge of the fingerprint sensor FS or a variable width, and not be limited to any one embodiment.

The step STP is provided by a size difference between the first opening part OP1 and the second opening part OP2. The step STP is defined along an edge of the first gap GA1.

Specifically, referring to FIG. 5C, the adhesive member RS may be accommodated in the first opening part OP1, and the fingerprint sensor FS may be accommodated in the second opening part OP2. The adhesive member RS is accommodated in the opening part OP to couple the fingerprint sensor FS and the display panel DP in the opening part OP. The step STP of the cover panel CVP may prevent interference between the fingerprint sensor FS and the cover panel CVP.

In the embodiment, the adhesive member RS may be spaced apart from the side surface of the first opening part OP1. A predetermined spaced space GA2 (hereinafter, referred to as a second gap) may be defined between the adhesive member RS and the side surface of the first opening part OP1. The second gap GA2 may be defined along an edge of the adhesive member RS on the plane. The second gap GA2 may have a constant width along the edge of the adhesive member RS or a variable width, and not be limited to any one embodiment.

First light L1 traveling toward the rear surface of the display panel DP is incident to the second gap GA2 between the fingerprint sensor FS and the first opening part OP1 of the opening part OP. The display panel DP includes a base substrate BS and a pixel layer PXL. The rear surface of the display panel DP may be defined by the rear surface of the base substrate BS. The pixel layer PXL may include the above-described plurality of pixels PX (refer to FIG. 3A).

The first light L1 may include natural light incident from the outside and/or light generated from the pixel layer PXL. At least a portion of the second gap GA2 between the fingerprint sensor FS and the first opening part OP1 may be blocked by the fingerprint sensor FS. Light passes through the second gap GA2 and then passes through the first gap GA1. Since the first gap GA1 has a width that is relatively narrower than that of the second gap GA2, second light L2 passing through the opening part OP and emitted to the rear surface of the cover panel CVP may have a light amount that is relatively less than that of the first light L1.

As the light amount of the second light L1 increases, a boundary of each of the cover panel CVP, the opening part OP, and the fingerprint sensor FS located on the rear surface of the display panel DP is easily recognized. That is, as the light amount of the second light L1 increases, the rear surface visible phenomenon of the display panel DP may increase.

According to the present invention, as the first opening part OP1 having a size less than the second opening part OP2 is defined in the first sheet ST1 adjacent to the display panel DP, light incident from the front surface of the display panel DP or light that is self-generated from the display panel DP may reduce a light amount transmitted through the opening part OP. The step STP defined in the opening part OP blocks continuity between a space in the first opening part OP1 and a space in the second opening part OP2. Thus, the first gap GA1 and the second gap GA2 have different sizes. According to the present invention, as the step STP is defined in the opening part OP, interference between the fingerprint sensing unit FSU and the second sheet ST2 may be minimized, and a space between the adhesive member RS or the fingerprint sensor FS and the cover panel CVP in the opening part OP may be reduced. Thus, the rear surface visible phenomenon of the display panel DP through the space between the fingerprint sensor FS and the cover panel CVP in the opening part OP may be prevented.

According to the present invention, the rear surface visible phenomenon of the display panel DP at an area adjacent to the fingerprint sensor FS may be easily prevented. Thus, an outdoor visibility of the electronic device ED may be enhanced, and a display characteristic may improve.

Figure 6C:
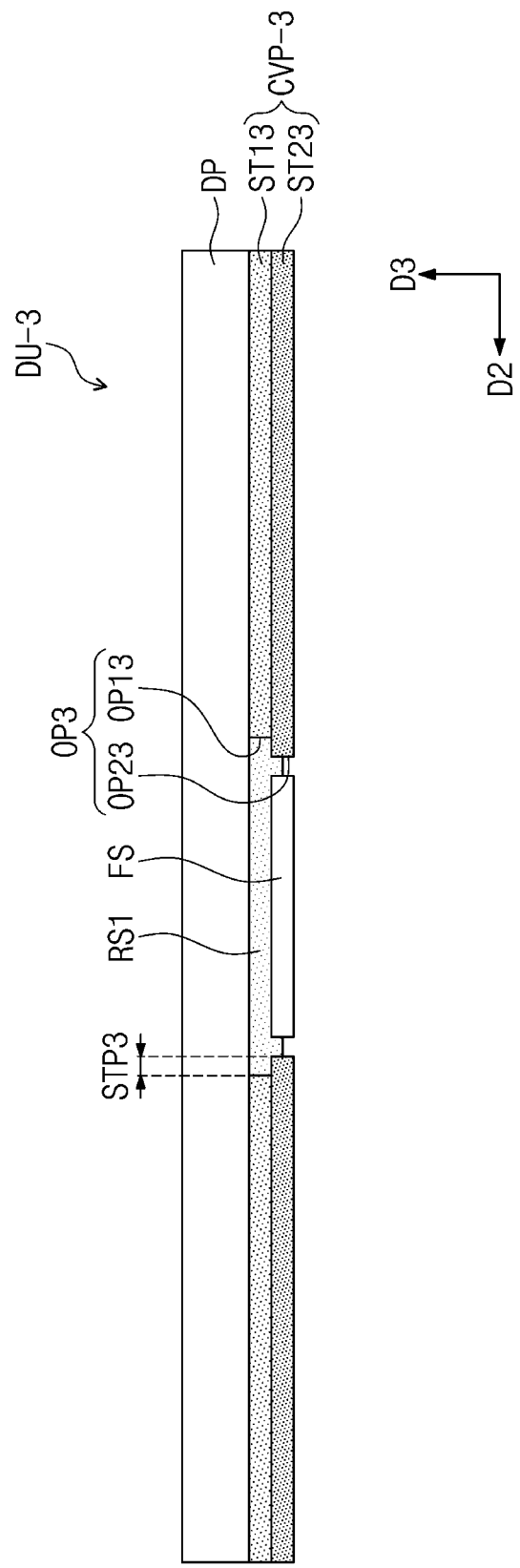

FIGS. 6A to 6C are cross-sectional views of display panel units according to an embodiment of the present invention. For easy description, cross-sectional views of the display panel units DU1, DU2, and DU3 corresponding to the area illustrated in FIG. 5B are illustrated in FIGS. 6A to 6C. Hereinafter, the present invention will be described with reference to FIGS. 6A to 6C. On the other hand, the same components as those described in FIGS. 1A to 5C are designated by the same reference symbols, respectively, and overlapped description thereof will be omitted.

As illustrated in FIG. 6A, in a display panel unit DU-1, a first sheet ST11 may contact an adhesive member RS. The adhesive member RS may have the same planar shape as the first opening part OP11. As a side surface of the first opening part OP11 contacts a side surface of the adhesive member RS, a contact surface XX may be provided to surround the adhesive member RS. A second opening part OP21 exposes at least a portion of the first opening part OP11. Thus, an opening part OP-1 defined in the cover panel CVP-1 has a step STP1.

In the embodiment, at least a portion of a fingerprint sensor FS may be supported by the first sheet ST11. The fingerprint sensor FS may be spaced apart from a side surface of the second opening part OP21. That is, the fingerprint sensor FS may have a planar size less than that of the second opening part OP21.

According to the present invention, as the first opening part OP11 is entirely filled by the adhesive member RS, a spaced space between the first opening part OP11 and the adhesive member RS is removed. Thus, although a predetermined spaced space exists between the second opening part OP21 and the fingerprint sensor FS, as a spaced space for light transmission in the first opening part OP11 is removed, the rear surface visible phenomenon of the display panel DP may be stably resolved.

Referring to FIG. 6B, in a display panel unit DU-2, a second sheet ST22 may contact a fingerprint sensor FS. Specifically, a second opening part OP22 may have a planar size corresponding to that of the fingerprint sensor FS. A side surface of the second opening part OP22 may provide a contact surface YY with the fingerprint sensor FS to surround the fingerprint sensor FS.

A first opening part OP12 passes through a first sheet ST12. The first opening part OP12 is connected with the second opening part OP22 to provide a step STP2 of an opening part OP-2. An adhesive member RS may be spaced apart from a side surface of the first opening part OP12. A predetermined spaced space is defined between the adhesive member RS and the first opening part OP12.

According to the present invention, although a predetermined space GA is defined in the first opening part OP12, as a side surface of the second opening part OP22 contacts the fingerprint sensor FS, light transmission at the opening part OP-2 of a cover panel CVP may be reduced. Thus, the rear surface visible phenomenon of the display panel DP may be stably resolved.

Referring to FIG. 6C, in a display panel unit DU-3, an opening part OP3 may be filled by an adhesive member RS1. Specifically, the adhesive member RS1 may fill a first opening part OP13 and a spaced space between a side surface of a second opening part OP23 and a fingerprint sensor FS. Thus, a step STP3 define din the opening part OP3 may be covered by the adhesive member RS-1.

According to the present invention, as the spaced space between the fingerprint sensor FS and the opening part OP-3 is filled by the adhesive member RS-1, the rear surface visible phenomenon of the display panel DP through the opening part OP-3 may be easily resolved.

Figure 7A:
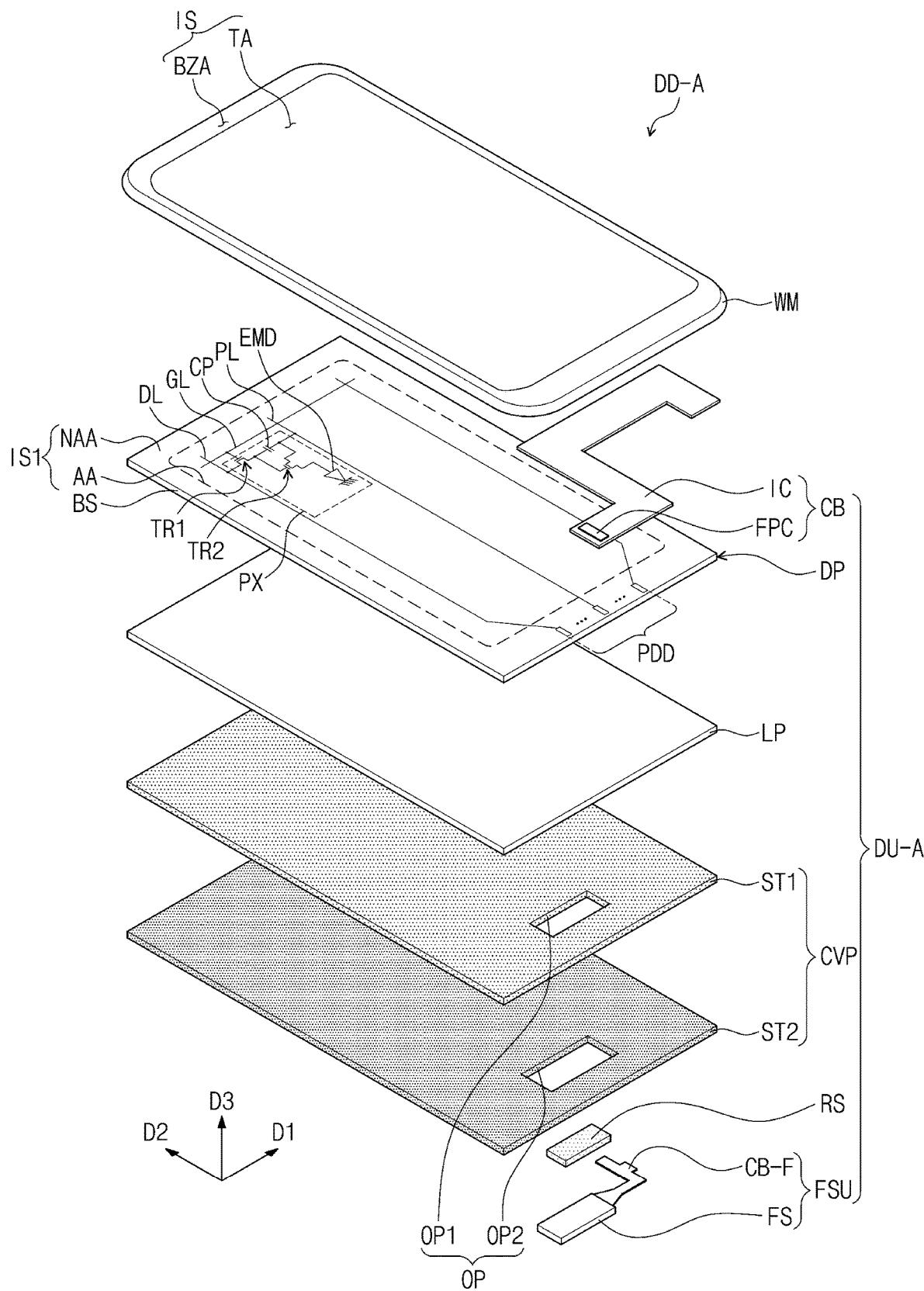
FIG. 7A is an exploded perspective view of a display device according to an embodiment of the present invention.
Figure 7B:
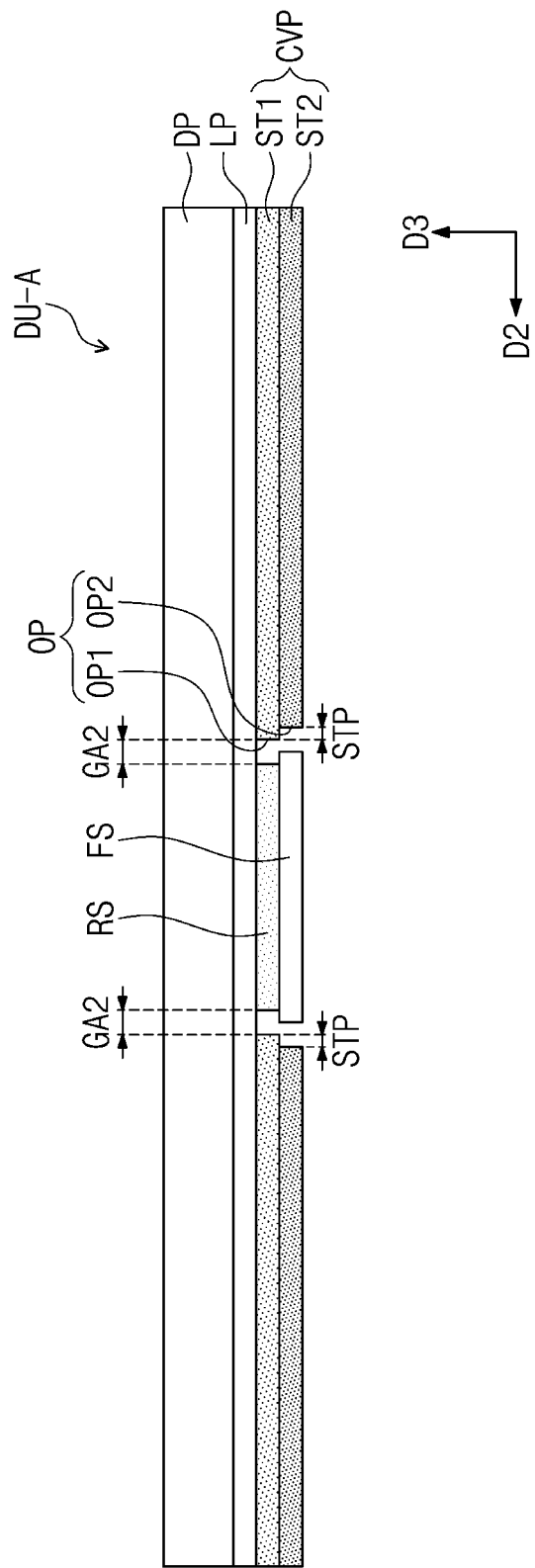
FIG. 7B is a cross-sectional view illustrating a portion of components illustrated in FIG. 7A.
Figure 7C:
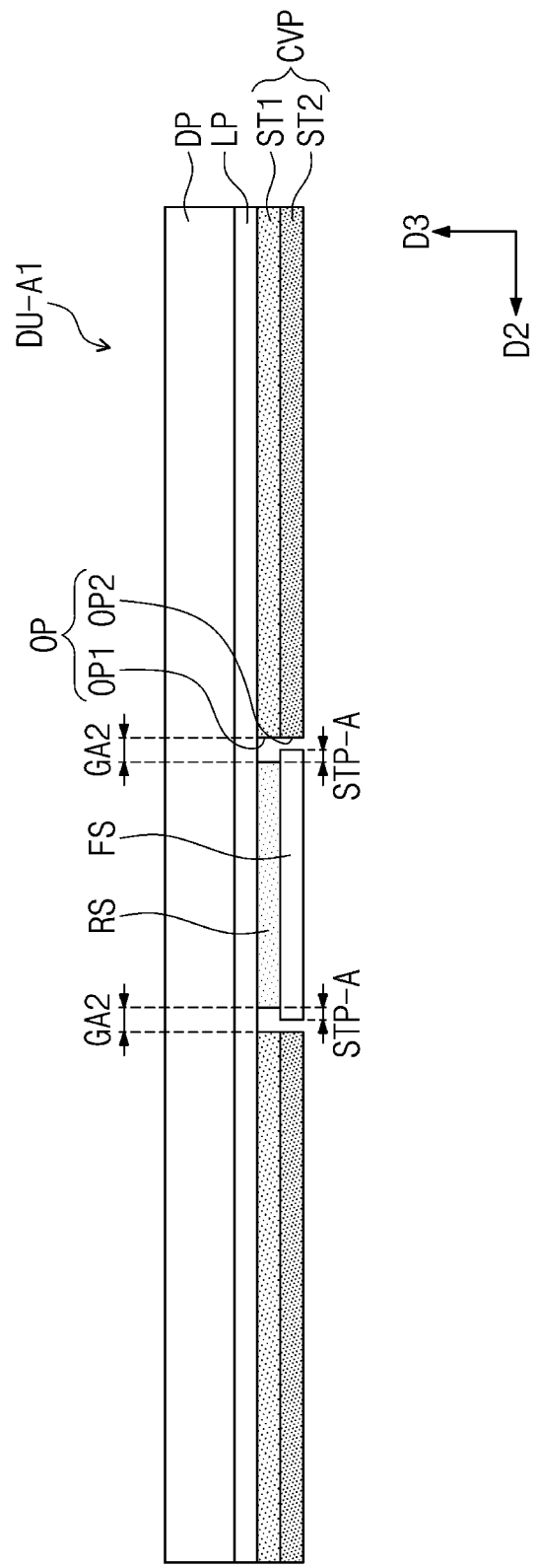
FIG. 7C is a cross-sectional view illustrating a display panel unit according to an embodiment of the present invention.

FIG. 7A is an exploded perspective view of a display device according to an embodiment of the present invention. FIG. 7B is a cross-sectional view illustrating a portion of components in FIG. 7A. FIG. 7C is a cross-sectional view illustrating a display panel unit according to an embodiment of the present invention. For easy description, FIG. 7A illustrates components corresponding those in FIG. 3A, FIG. 7B illustrates a display panel unit DU-A, and FIG. 7C illustrates a display panel unit DU-A1, wherein a portion of components are omitted in each of FIGS. 7A to 7C. Hereinafter, the present invention will be described with reference to FIGS. 7A to 7C. On the other hand, the same components as those described in FIGS. 1A to 6C are designated by the same reference symbols, respectively, and overlapped description thereof will be omitted.

As illustrated in FIGS. 7A and 7B, a display device DD-A may include a display panel DU-A further including a lower panel LP. The lower panel LP is located between a cover panel CVP and a display panel DP. The lower panel LP may contact a rear surface of the display panel DP. Here, although not shown, the lower panel LP may be attached to the rear surface of the display panel DP through an adhesive member that is separately provided.

The lower panel LP may include metal and/or an alloy. The lower panel LP may have a heat generation property. For example, the lower panel LP may include metal having a high thermal conductivity. Alternatively, for example, the lower panel LP may have a high modulus. For example, the lower panel LP may include stainless steel such as SUS having a high rigidity.

In the embodiment, the lower panel LP may have a high reflectance. Thus, the lower panel LP may reflect most of light incident to the lower panel LP.

On the other hand, as illustrated in FIG. 7C, in a display panel unit DU-A1, a step of an opening part OP-A may be omitted. Here, a side surface of a first opening part OP1A and a side surface of a second opening part OP2A may be aligned on a cross-section. However, a step STP-A may be defined between a fingerprint sensor FS and an adhesive member RS in the opening part OP-A. The step STP-A may partially block a continuity of a spaced space GA2 existing in the first opening part OP1A. According to the present invention, as a lower panel LP has a high reflectance, light incident to a cover panel CVP may be easily blocked.

According to the present invention, as the lower panel LP is further contained, a light amount emitted to a rear surface of the display panel DP may be reduced to easily resolve the rear surface visible phenomenon of the display panel DP.

Figure 8A:
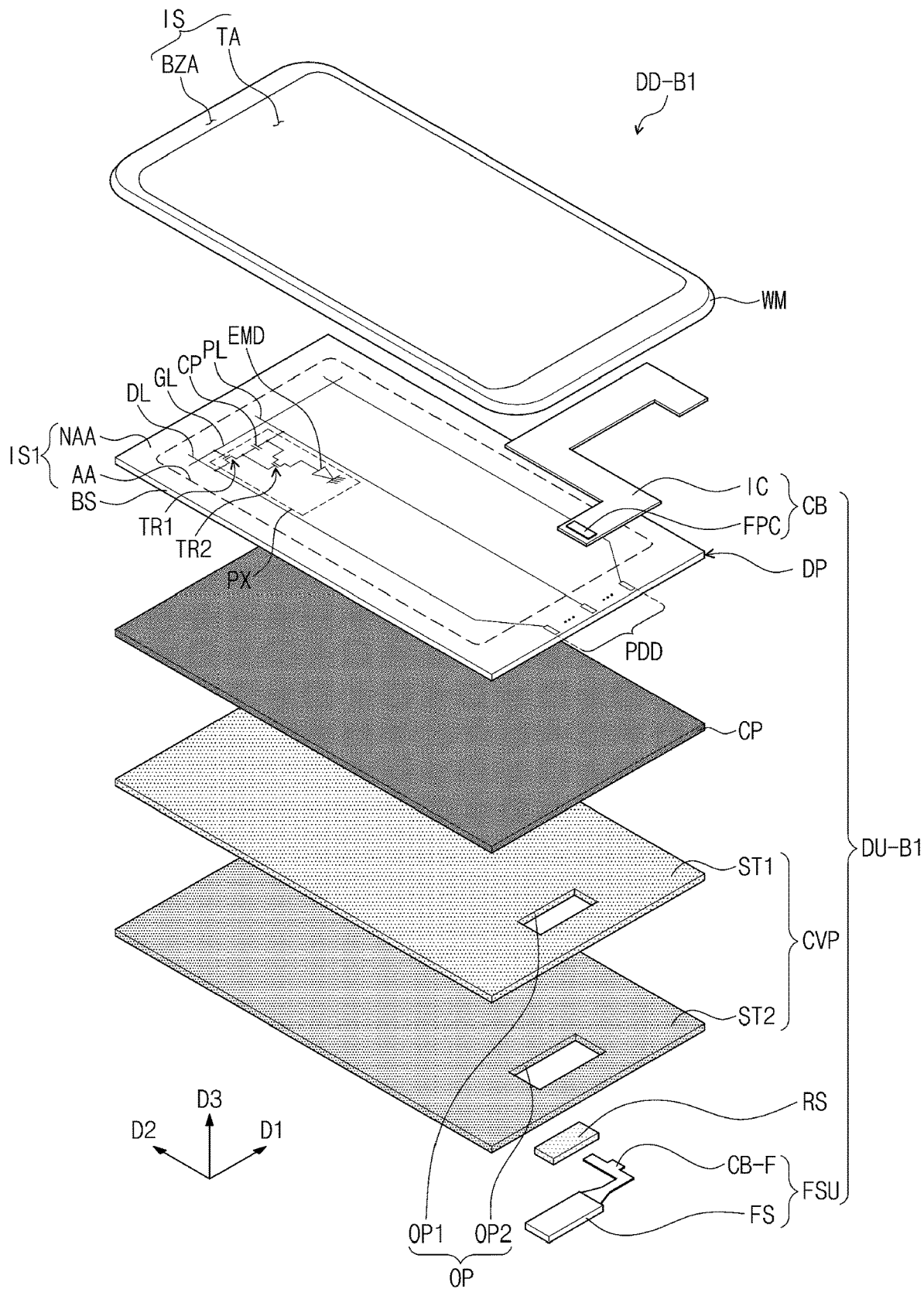
FIG. 8A is an exploded perspective view of a display device according to an embodiment of the present invention.
Figure 8B:
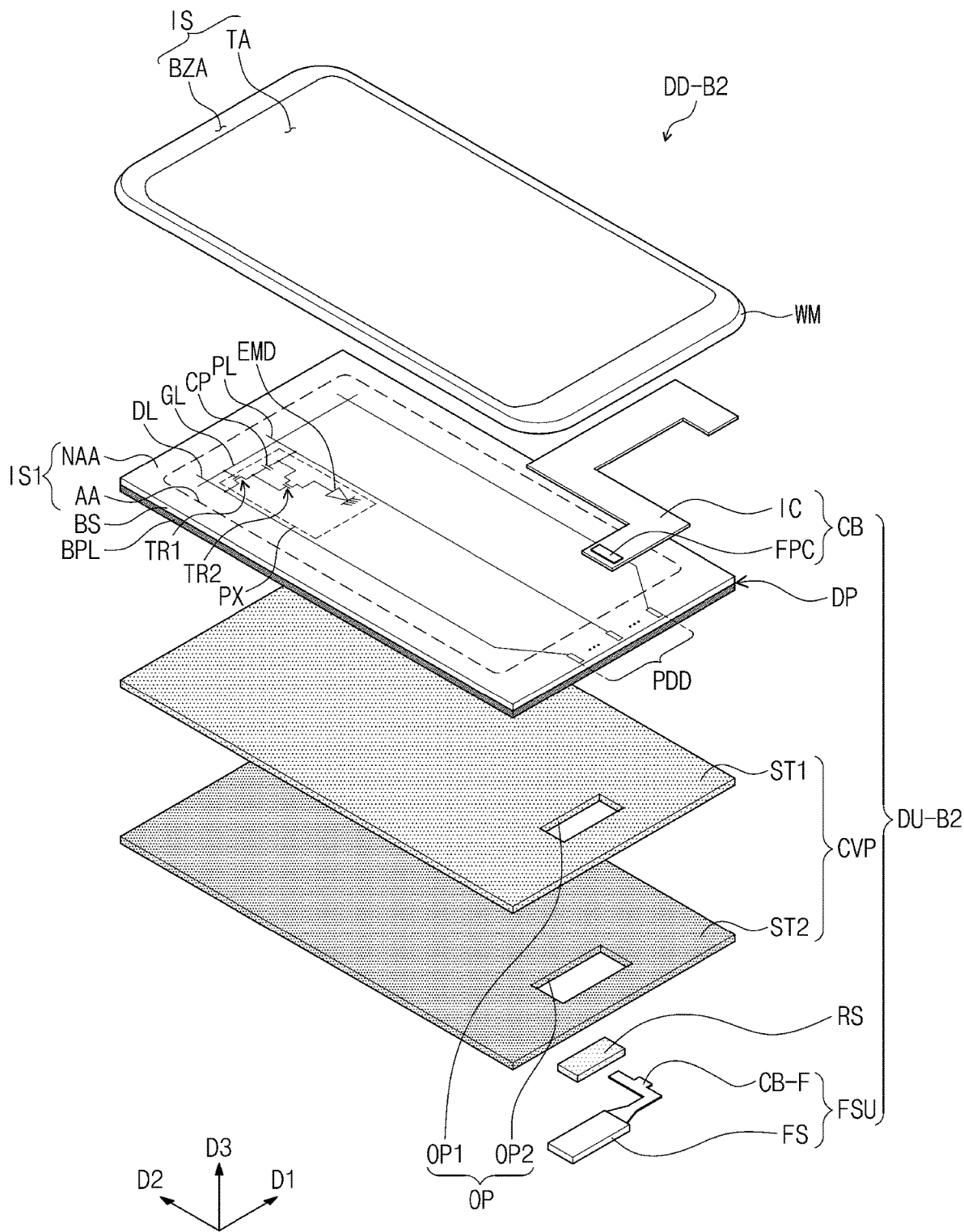
FIG. 8B is a cross-sectional view illustrating a portion of components illustrated in FIG. 8A.
Figure 8C:
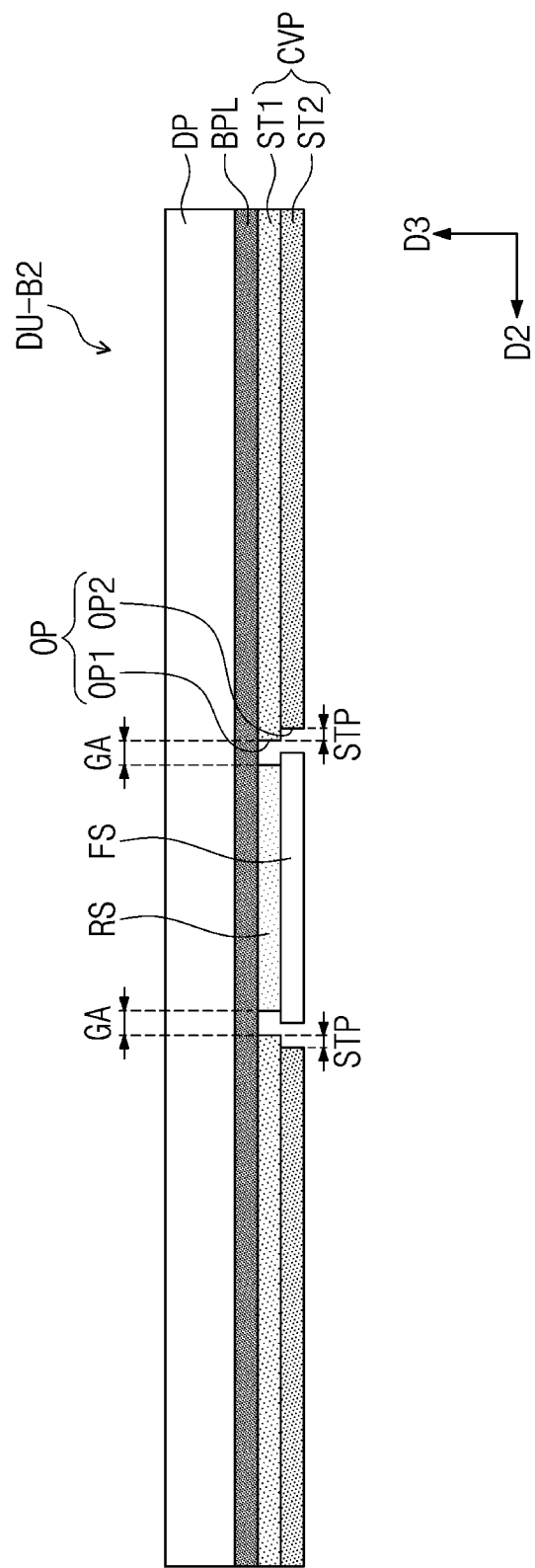
FIG. 8C is a cross-sectional view illustrating a portion of components of the display device according to an embodiment of the present invention.

FIG. 8A is an exploded perspective view of a display device according to an embodiment of the present invention. FIG. 8B is a cross-sectional view illustrating a portion of components in FIG. 8A. FIG. 8C is a cross-sectional view illustrating a portion of components of the display device according to an embodiment of the present invention. For easy description, FIG. 8A illustrates components corresponding to those in FIG. 7A, and FIGS. 8B and 8C illustrates components corresponding those in FIG. 7B. Hereinafter, the present invention will be described with reference to FIGS. 8A to 8C. Here, the same components as those described in FIGS. 1A to 7B are designated by the same reference symbols, respectively, and overlapped description thereof will be omitted.

As illustrated in FIG. 8A, a display device DD-B1 may further include a first rear surface cover layer CP located between a display panel DP and a cover panel CVP. The first rear surface cover layer CP may be a panel having a plate shape that is provided independently from the display panel DP. The first rear surface cover layer CP may be assembled in a state in which the first rear surface cover layer CP contacts a rear surface of the display panel DP or attached to the rear surface of the display panel DP through an adhesive member.

Alternatively, as illustrated in FIG. 8B, a display device DD-B2 may further include a second rear surface cover layer BPL located on a rear surface of a display panel DP. The second rear surface cover layer BPL may be located on a rear surface of a base substrate BS of the display panel DP to entirely cover the rear surface of a base substrate BS. The second rear surface cover layer BPL may be a coating layer. The second rear surface cover layer BPL may be directly provided on the rear surface of a base substrate BS through a process such as coating/deposition/printing. The second rear surface cover layer BPL may have a color projected to a base substrate BS. Thus, the base substrate BS may exhibit an effect of substantially having a black color.

However, this is merely illustrative, and the base substrate BS according to an embodiment of the present invention may have own predetermined color. For example, the base substrate BS may have a color having a low light transmittance such as a black color. Here, the second rear surface cover layer BPL may be omitted.

FIG. 8C illustrates a cross-sectional view of the display panel unit including the second rear surface cover layer BPL. However, this is merely illustrative, and a cross-sectional view of the display panel unit including the first rear surface cover layer CP may be also illustrated in correspondence thereto. Hereinafter, the first rear surface cover layer CP and the second rear cover layer BPL will be described.

Each of the first rear surface cover layer CP and the second rear cover layer BPL may have a predetermined color. Each of the first rear surface cover layer CP and the second rear cover layer BPL may have a color having a high light absorption rate. For example, each of the first rear surface cover layer CP and the second rear cover layer BPL may have a black color. Thus, as a light amount emitted to a rear surface of the display panel DP is reduced, the rear surface visible phenomenon of the display panel DP may be stably prevented.

On the other hand, a base substrate BS may have a predetermined color. Here, as the light amount emitted to the rear surface of the display panel DP is further reduced, a display characteristic of the display panel DP may improve.

Figure 9A:
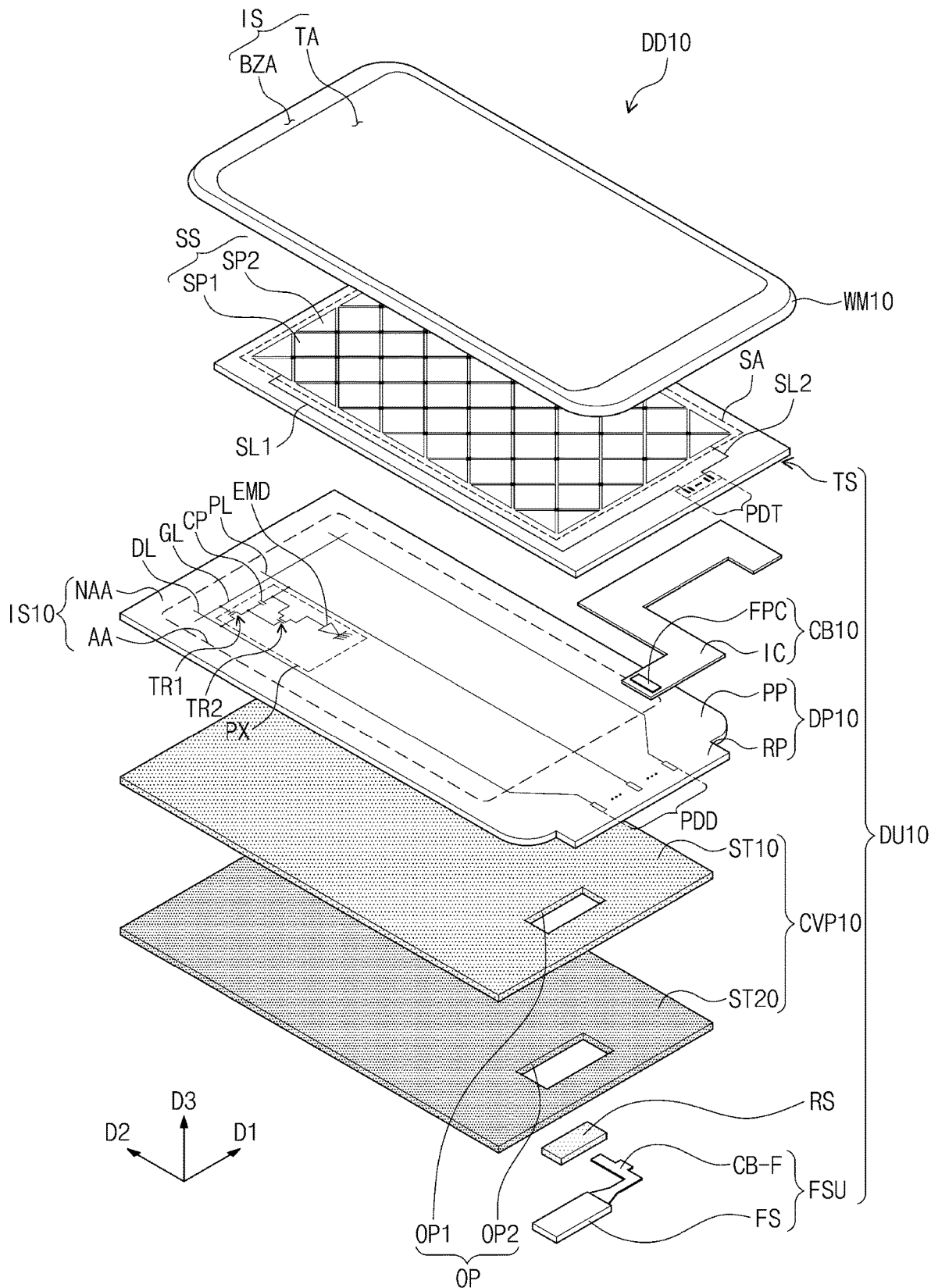
FIG. 9A is an exploded perspective view of a display device according to an embodiment of the present invention.
Figure 9B:
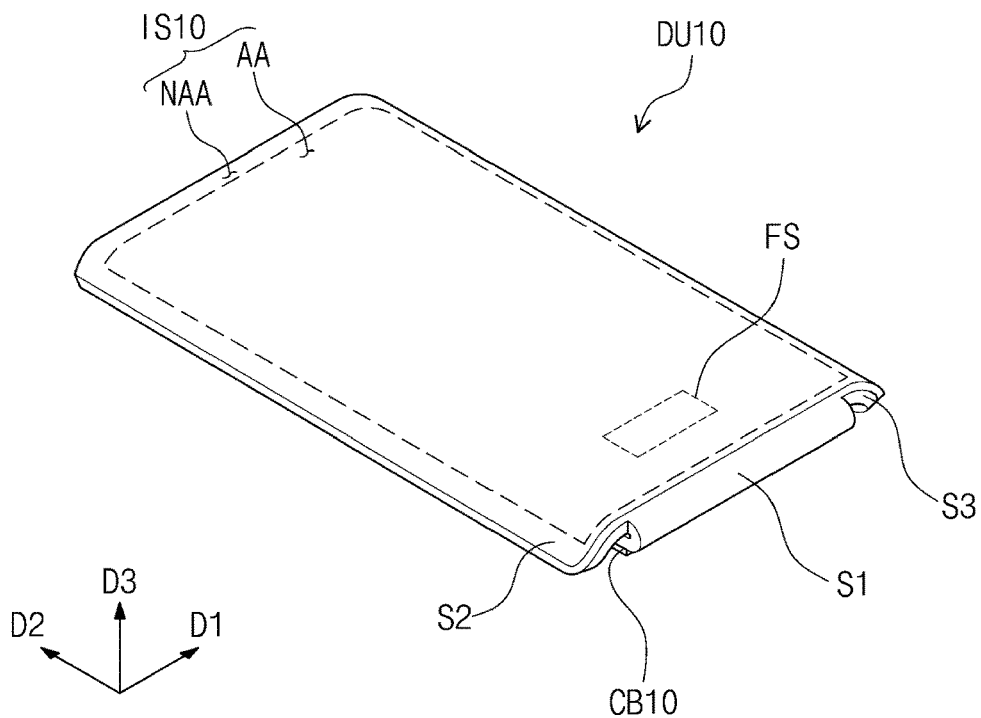
FIG. 9B is a coupling perspective view of a display panel unit according to an embodiment of the present invention.
Figure 9C:
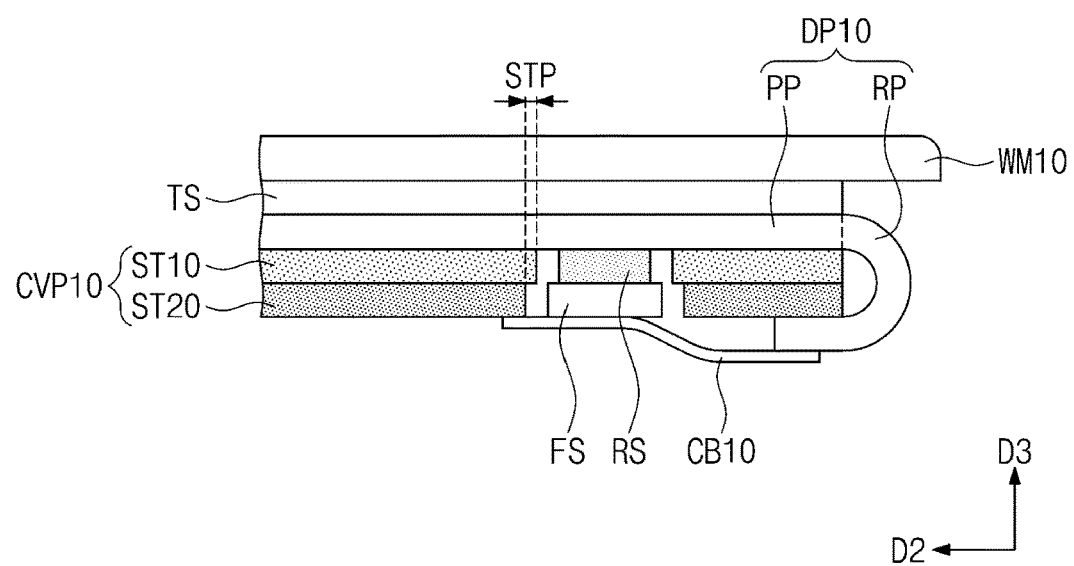
FIG. 9C is a side view of the display device in FIG. 9A.

FIG. 9A is an exploded perspective view of a display device according to an embodiment of the present invention. FIG. 9B is a coupling perspective view of a display panel unit according to an embodiment of the present invention. FIG. 9C is a side view of the display device in FIG. 9A. Hereinafter, the present invention will be described with reference to FIGS. 9A to 9C. Here, the same components as those described in FIGS. 1A to 8B are designated by the same reference symbols, respectively, and overlapped description thereof will be omitted.

As illustrated in FIG. 9A, a display device DD10 includes a window member WM10 and a display panel unit DU10. Since the window member WM10 corresponds to the window member WM in FIG. 1A, overlapped description thereof will be omitted below.

The display panel unit DU10 may include a display panel DP10, a circuit board CB10, a touch sensor TS, a cover panel CVP, a fingerprint sensing unit FSU, and a light absorbing cover ABS. The display panel DP10 has a shape having one protruding side on the plane. In the embodiment, the display panel DP10 may include a planar part PP and a protruding part RP. The protruding part RP may have a protruding shape from one side of the planar part PP in the first direction D1. In the embodiment, pads PDD may be located on the protruding part RP. Here, since signal lines DL, GL, and PL, a pixel PX, and the pads PDD, which constitute the display panel DP10, correspond to the components of the display panel DP (refer to FIG. 3A) in FIG. 3A, overlapped description thereof will be omitted.

The touch sensor TS may be located on the display panel DP10. The touch sensor TS may sense an external input to acquire information on a position and an intensity of the external input. The external input may include various embodiments. For example, the external input includes various types of external inputs such as a portion of a user's body, light, heat, or pressure. Also, the touch sensor TS may sense an input approaching or being adjacent as well as an input contacting the touch sensor TS.

The touch sensor TS may include a sensing area SA and a non-sensing area NSA. The sensing area SA may overlap a display area DA. In the embodiment, an active area AA may include the sensing area SA and the display area DA.

The non-sensing area NSA is located adjacent to the sensing area SA. The non-sensing area NSA may surround an edge of the sensing area SA. However, this is merely illustrative, and the non-sensing area NSA may be located adjacent to only a portion of a side of the sensing area SA or omitted and not be limited to any one embodiment.

A sensing electrode SS is located at the sensing area SA. The sensing electrode SS may include a first sensing electrode SP1 and a second sensing electrode SP2, which receive different electrical signals. The sensing electrode SS may acquire information on an external input TC through a variation of a capacitance between the first sensing electrode SP1 and the second sensing electrode SP2.

The first sensing electrode SP1 extends in the second direction D2. The first sensing electrode SP1 may include a plurality of conductive patterns connected to each other in the second direction D2. The first sensing electrode SP1 may be provided in plurality and spaced apart from each other in the first direction D1.

The second sensing electrode SP2 extends in the first direction D1. The second sensing electrode SP2 may include a plurality of conductive patterns connected to each other in the first direction D1. The second sensing electrode SP2 may be provided in plurality and spaced apart from each other in the second direction D2.

Sensing lines SL1 and SL2 and sensing pads PDT are located at the non-sensing area NSA. The sensing pads PDT are connected to the sensing lines SL1 and SL2, respectively. The sensing lines SL1 and SL2 includes a first sensing line SL1 and a second sensing line SL2. The first sensing line SL1 connects the first sensing electrode SP1 and the sensing pad PDT and transmits an electrical signal provided from the outside through the sensing pad PDT to the first sensing electrode SP1. The second sensing line SL2 connects the second sensing electrode SP2 and the sensing pad PDT and transmits an electrical signal provided from the outside through the sensing pad PDT to the second sensing electrode SP2.

The sensing pad PDT may extend until one protruding side of the display panel DP10 and be electrically connected with the display panel DP10. Alternatively, the sensing pad PDT may be located on a different layer separately from the pads PDD of the display panel.

The touch sensor TS may be located directly on the display panel DP10. For example, the sensing electrode SS or the sensing lines SL1 and SL2 may be provided directly on the display panel DP10. Alternatively, the touch sensor TS may be provided separately from the display panel DP10, and then attached onto the display panel DP10 through an adhesive member. Alternatively, the touch sensor TS may be located on a rear surface of the display panel DP10 or embedded in the display panel DP10. The touch sensor TS according to an embodiment of the present invention may have various types and not be limited to any one embodiment.

The circuit board CB10 is coupled to one side of the display panel unit DU10. Specifically, the circuit board CB10 may be coupled to a first side S1 of the display panel unit DU10. The first side S1 of the display panel unit DU10 may correspond to the protruded protruding part RP of the display panel DP10. The circuit board CB10 is electrically connected to the pads PDD of the display panel. Also, the circuit board CB10 may be electrically coupled with the sensing pad PDT. Thus, the display panel DP10 and the touch sensor TS may be driven in one circuit board CB10. However, this is merely illustrative, and the circuit board CB10 may be separately provided to each of the display panel DP10 and the touch sensor TS and not be limited to any one embodiment.

As illustrated in FIGS. 9B and 9C, the first side S1 of the display panel unit DU10 may be bent in a direction opposed to the third direction D3, i.e., bent toward the rear surface of the display panel unit DU10. The protruding part RP may be bent from the planar part PP and located on the rear surface of the display panel DP10. The protruding part RP may correspond to the first side S1, and the first side S1 may be an area connected with the circuit board CB10 as described above.

As the first side S1 of the display panel unit DU10 is bent, the circuit board CB10 may be assembled in a state in which the circuit board CB10 is located on the rear surface of the display panel DP10. According to the present invention, although the circuit board CB10 is rigid, as one side of the display panel unit DU10 is bent, the circuit board CB10 may be located on the rear surface of the display panel DP10 and coupled thereto.

Also, the display panel unit DU10 may further include a plurality of bent sides. The display panel unit DU10 according to the embodiment has a second side S2 and a third side S3, which each extend in the first direction D1, are opposed to each other in the second direction D2, and are each bent in a direction opposed to the third direction D3. In the embodiment, a portion of a front surface IS10 of the display panel unit DU10 may be bent, and a portion of an active area AA, which is defined in each of the second side S2 and the third side S3, may be bent.

Thus, as the electronic device ED10 according to an embodiment of the present invention includes the display panel unit DU10 having at least one bent side, the display panel unit DU10 may reduce an area of a bezel area BZA and improve an esthetic sense. However, this is merely illustrative, and although at least one of the first side S1, the second side S2, and the third side S3 may not be bent, or all of four side surfaces of the display panel unit DU10 may be bent, the embodiment of the present invention is not limited to any one embodiment. The electronic device ED10 according to an embodiment of the present invention may include display panel units having various shapes and not be limited to any one embodiment.

According to the present invention, a cover panel CVP10 may be located at a position corresponding to the planar part PP and coupled with the display panel DP10. An opening part OP10 of the cover panel CVP10 may be defined at a position overlapping the planar part PP. Thus, the adhesive member RS and the fingerprint sensor FS may be located on a rear surface of the planar part PP.

A step STP defined in the cover panel CVP may be stably located on the display panel DP10, particularly the rear surface of the planar part PP. According to the present invention, although at least one side of the display panel unit DU10 is bent, a rear surface visible defect of the display panel DP10, which is generated in an area adjacent to the fingerprint sensor FS, may be resolved, and thus the electronic device ED10 having an improved display characteristic may be provided.

It will be apparent to those skilled in the art that various modifications and variations can be made in the inventive concept. Thus, it is intended that the present disclosure covers the modifications and variations of this invention provided they come within the scope of the appended claims and their equivalents.

Hence, the real protective scope of the present invention shall be determined by the technical scope of the accompanying claims.

INDUSTRIAL APPLICABILITY

As the electronic device includes the fingerprint sensing unit, the electronic device may sense fingerprint information of a user and, through this, provide various functions capable of organically communicating with the use to enhance affinity with the user. The present invention related to the electronic device including the fingerprint sensing unit has high industrial applicability.

The invention claimed is:

1. An electronic device comprising:
a display panel comprising:
a base substrate comprising a front surface and a rear surface opposed to the front surface; and
a plurality of pixels on the front surface of the base substrate configured to display an image;
a cover panel on the rear surface of the display panel and having an opening part;
a fingerprint sensor accommodated in the opening part; and
an adhesive member in the opening part and between the fingerprint sensor and the display panel,
wherein the opening part comprises a side surface having a step with the fingerprint sensor spaced apart from and coplanar with the side surface having the step, and
wherein the fingerprint sensor faces the side surface having the step in a cross sectional view.

2. The electronic device of claim 1, wherein the cover panel comprises:
a first sheet on the rear surface of the display panel; and
a second sheet on a rear surface of the first sheet,
wherein the opening part comprises:
a first opening part passing through the first sheet; and
a second opening part passing through the second sheet and overlapping the first opening part,
wherein the first opening part has a planar size less than that of the second opening part.

3. The electronic device of claim 2, wherein the first sheet comprises an embossing panel having waviness.

4. The electronic device of claim 3, wherein the second sheet comprises a cushion panel.

5. The electronic device of claim 2, wherein the adhesive member contacts the first sheet.

6. The electronic device of claim 5, wherein the fingerprint sensor is spaced apart from the second sheet.

7. The electronic device of claim 2, wherein the adhesive member is spaced apart from the first sheet.

8. The electronic device of claim 2, wherein the fingerprint sensor is spaced apart from the side surface of the opening part with a predetermined space therebetween, and
the space is filled by the adhesive member.

9. The electronic device of claim 1, wherein the front surface of the base substrate is divided into a first area on which the image is displayed and a second area adjacent to the first area, and
the opening part overlaps the first area in a plan view.

10. The electronic device of claim 1, further comprising a lower panel between the cover panel and the display panel, and
the adhesive member couples the lower panel with the fingerprint sensor.

11. The electronic device of claim 10, wherein the lower panel comprises metal.

12. The electronic device of claim 1, further comprising a cover layer configured to cover the rear surface of the display panel, and
the cover layer has a black color.

13. The electronic device of claim 12, wherein the base substrate has a color.

14. The electronic device of claim 1, further comprising:
a circuit board connected to one side of the base substrate; and
a sensing circuit board connected with the fingerprint sensor and extending to outside of the opening part to electrically connect the fingerprint sensor and the circuit board.

15. The electronic device of claim 1, further comprising a touch sensing unit on the front surface of the base substrate, and
the touch sensing unit overlaps the pixels in a plan view.

16. The electronic device of claim 1, wherein the base substrate comprises a planar part and a bending part connected with the planar part and bent toward the rear surface of the base substrate, and
the cover panel is between the planar part and the bending part.

17. An electronic device comprising:
a display panel comprising:
a front surface comprising a display area configured to display an image and a peripheral area adjacent to the display area; and
a rear surface opposed to the front surface;
a first sheet on the rear surface of the display panel and having a first opening part overlapping the display area;
a second sheet below the first sheet and having a second opening part overlapping the first opening part;
a fingerprint sensor on the rear surface of the display panel and accommodated in the second opening part with the fingerprint sensor spaced apart from the second sheet in the second opening part; and
an adhesive member between the fingerprint sensor and the display panel and in the first opening part,
wherein the adhesive member has a planar size less than that of the fingerprint sensor, and
wherein each of planar sizes of the first opening and the second opening is larger than that of the fingerprint sensor.

18. The electronic device of claim 17, wherein the first opening part has a planar size less than that of the second opening part.

19. The electronic device of claim 18, wherein the adhesive member contacts a side surface of the first opening part.

20. The electronic device of claim 18, wherein the adhesive member is spaced apart from a side surface of the first opening part.

21. The electronic device of claim 17, further comprising a lower panel between the first sheet and the display panel, and the lower panel comprises a light reflecting material.

22. The electronic device of claim 17, further comprising a rear surface cover layer between the first sheet and the display panel to cover the rear surface of the display panel, and the rear surface cover layer comprises a light absorbing material.

23. The electronic device of claim 22, wherein the rear surface cover layer is directly on the rear surface of the display panel.

* * * * *